US007724205B2

(12) United States Patent
Inazumi

(10) Patent No.: US 7,724,205 B2
(45) Date of Patent: May 25, 2010

(54) IMAGE DISPLAY CONTROL METHOD, APPARATUS FOR CONTROLLING IMAGE DISPLAY, AND PROGRAM FOR CONTROLLING IMAGE DISPLAY

(75) Inventor: Mitsuhiro Inazumi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1073 days.

(21) Appl. No.: 11/007,622

(22) Filed: Dec. 9, 2004

(65) Prior Publication Data

US 2005/0140568 A1    Jun. 30, 2005

(30) Foreign Application Priority Data

Dec. 10, 2003    (JP) .............................. 2003-411848

(51) Int. Cl.
    G09G 5/00    (2006.01)
(52) U.S. Cl. .............................. 345/1.3; 345/3.1; 345/9;
    352/70; 352/71; 382/254; 382/275; 382/276;
    382/284; 382/294
(58) Field of Classification Search .................. 345/1.3,
    345/3.1, 9; 382/254, 275, 276, 284, 294;
    352/70, 71; 348/745
    See application file for complete search history.

(56) References Cited

U.S. PATENT DOCUMENTS

| 5,136,390 | A | * | 8/1992 | Inova et al. ................. 348/383 |
| 5,396,257 | A | * | 3/1995 | Someya et al. ............... 345/1.1 |
| 5,822,002 | A | * | 10/1998 | Tokoro et al. ............... 348/383 |
| 5,880,815 | A | * | 3/1999 | Yamamura et al. ............ 352/70 |
| 5,988,817 | A | * | 11/1999 | Mizushima et al. .......... 353/94 |
| 6,081,648 | A | * | 6/2000 | Sugiyama ..................... 386/68 |
| 6,222,593 | B1 | * | 4/2001 | Higurashi et al. ........... 348/745 |
| 6,310,650 | B1 | * | 10/2001 | Johnson et al. ............. 348/383 |
| 6,310,680 | B1 | * | 10/2001 | Taniguchi ..................... 355/53 |
| 6,456,339 | B1 | * | 9/2002 | Surati et al. ................. 348/745 |
| 6,471,355 | B1 | * | 10/2002 | Monson et al. ............... 353/30 |
| 6,515,734 | B1 | * | 2/2003 | Yamada et al. ............... 355/54 |
| 6,558,006 | B2 | * | 5/2003 | Ioka ............................. 353/94 |
| 6,804,406 | B1 | * | 10/2004 | Chen ............................ 382/254 |
| 6,814,448 | B2 | * | 11/2004 | Ioka ............................. 353/94 |
| 6,940,529 | B2 | * | 9/2005 | Deering ...................... 345/647 |
| 2002/0008697 | A1 | * | 1/2002 | Deering ...................... 345/418 |
| 2002/0024640 | A1 | * | 2/2002 | Ioka ............................. 353/94 |
| 2002/0070944 | A1 | * | 6/2002 | Deering ...................... 345/581 |
| 2003/0206179 | A1 | * | 11/2003 | Deering ...................... 345/589 |
| 2004/0252228 | A1 | * | 12/2004 | Waki et al. ................... 348/383 |

FOREIGN PATENT DOCUMENTS

| JP | 04-269793 A | 9/1992 |
| JP | 07-298079 A | 11/1995 |

(Continued)

*Primary Examiner*—Bipin Shalwala
*Assistant Examiner*—Afroza Y Chowdhury
(74) *Attorney, Agent, or Firm*—Oliff & Berridge, PLC

(57) ABSTRACT

When a whole image having a large area or high resolution is displayed, the boundary lines are made less noticeable with a small amount of calculation by displaying partial images by a plurality of image projection units. An apparatus has a division position creation unit to create division positions such that the division positions vary at given timings, an image division unit to divide images at the division positions created by the division position creation unit, and plural image projection units PJ1, PJ2, . . . , PJN to display the images divided by the image division unit.

11 Claims, 26 Drawing Sheets

FOREIGN PATENT DOCUMENTS

| | | |
|---|---|---|
| JP | 08-294073 A | 11/1996 |
| JP | 2000-330495 A | 11/2000 |
| JP | 2002-209162 A | 7/2002 |
| JP | 2002-238064 A | 8/2002 |
| JP | 2002-277958 A | 9/2002 |
| JP | 2003-005737 | 1/2003 |

* cited by examiner

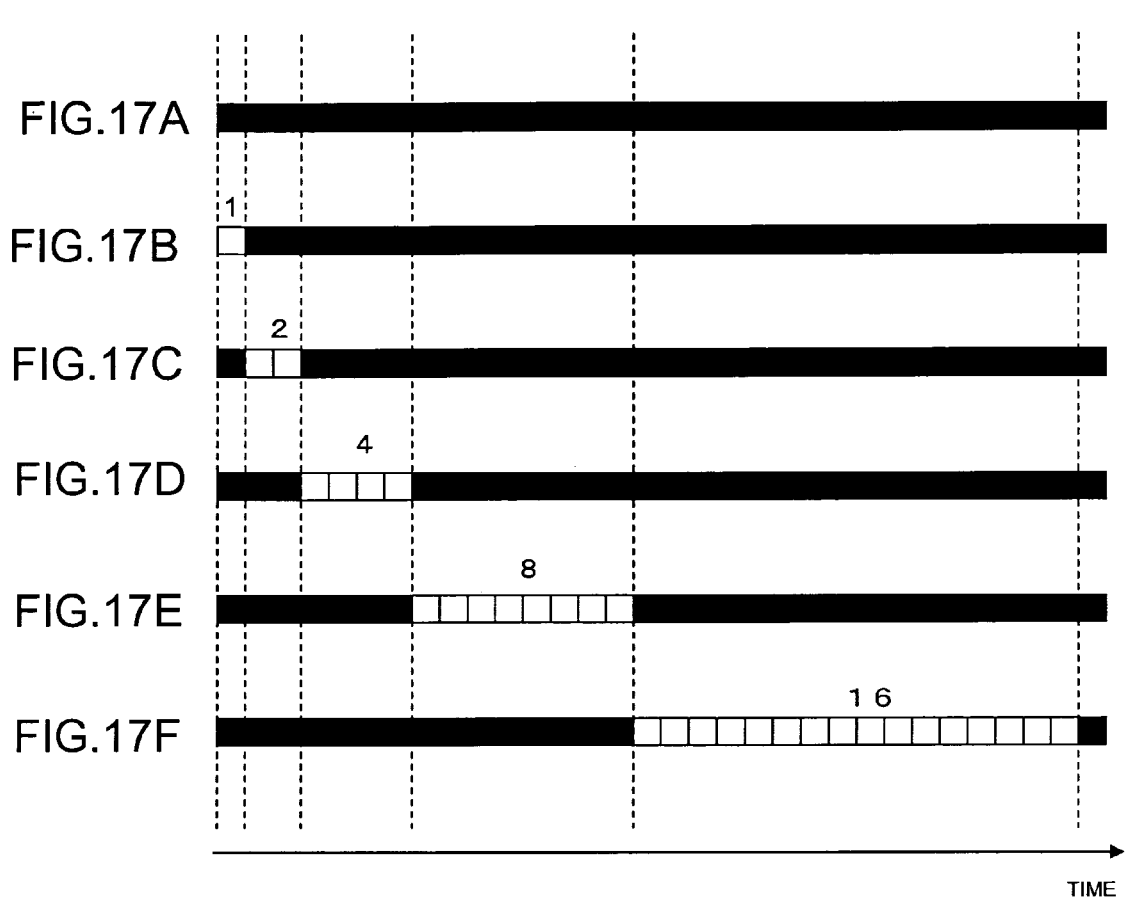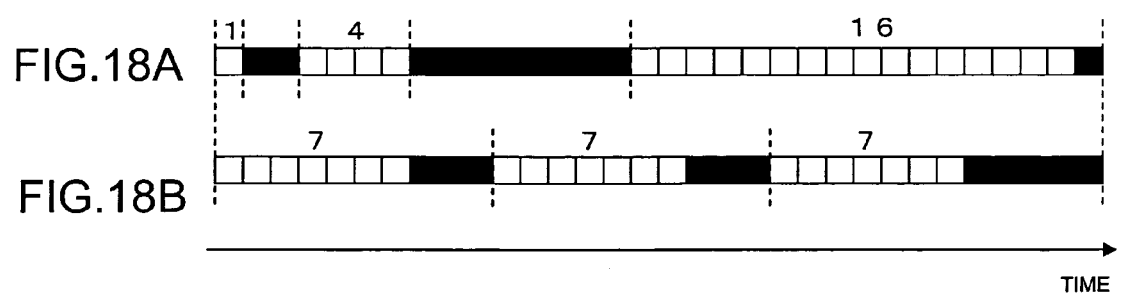

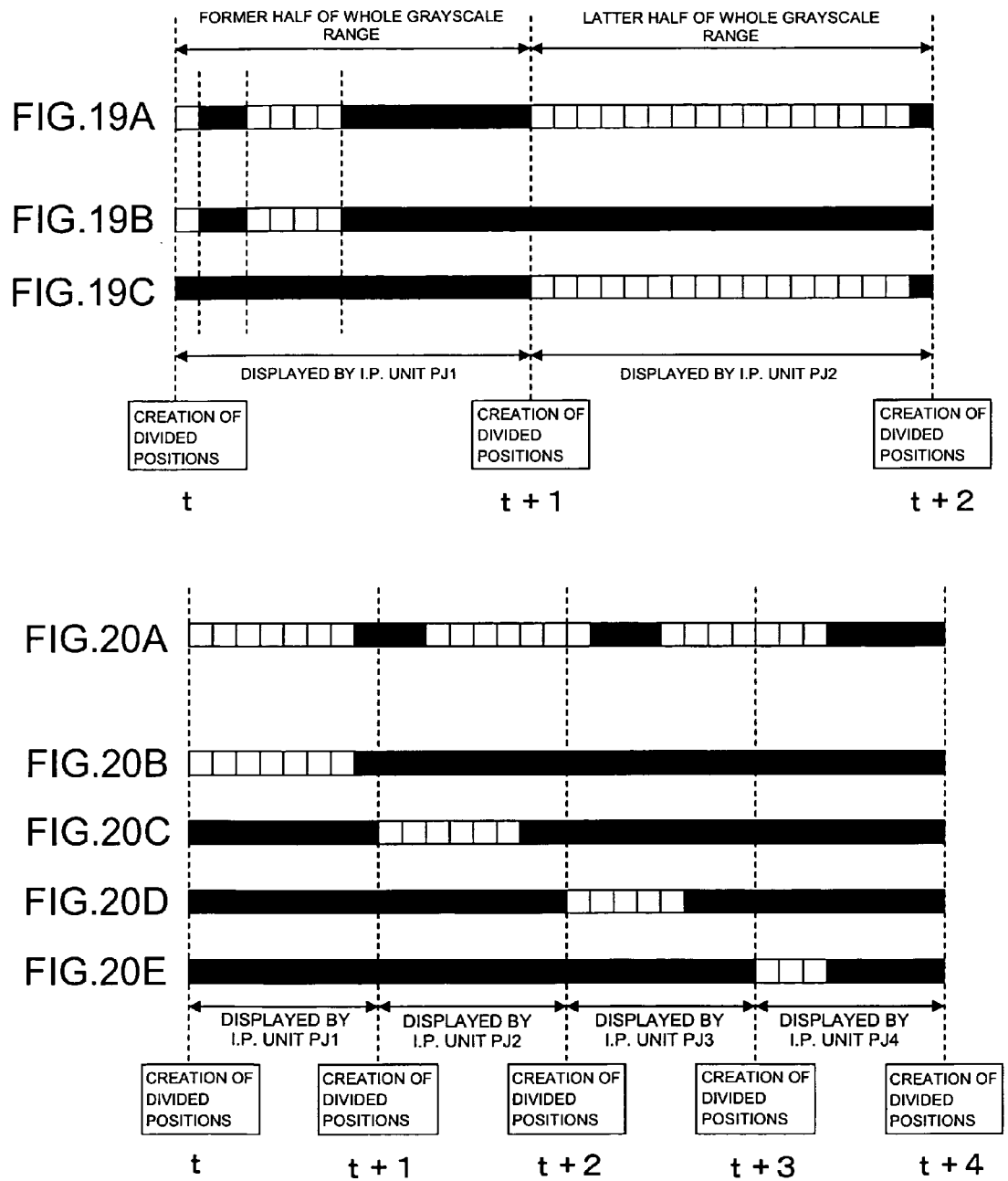

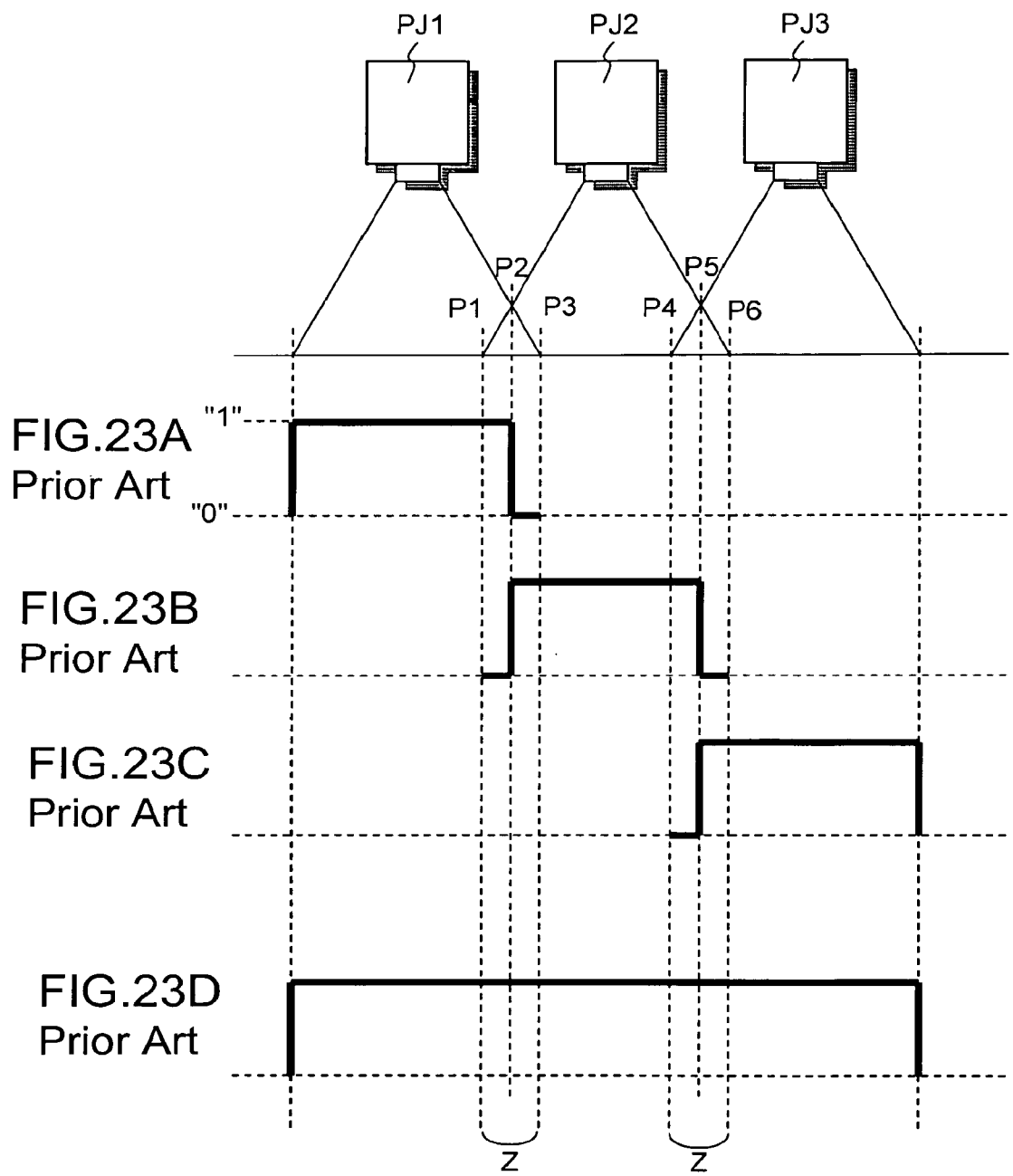

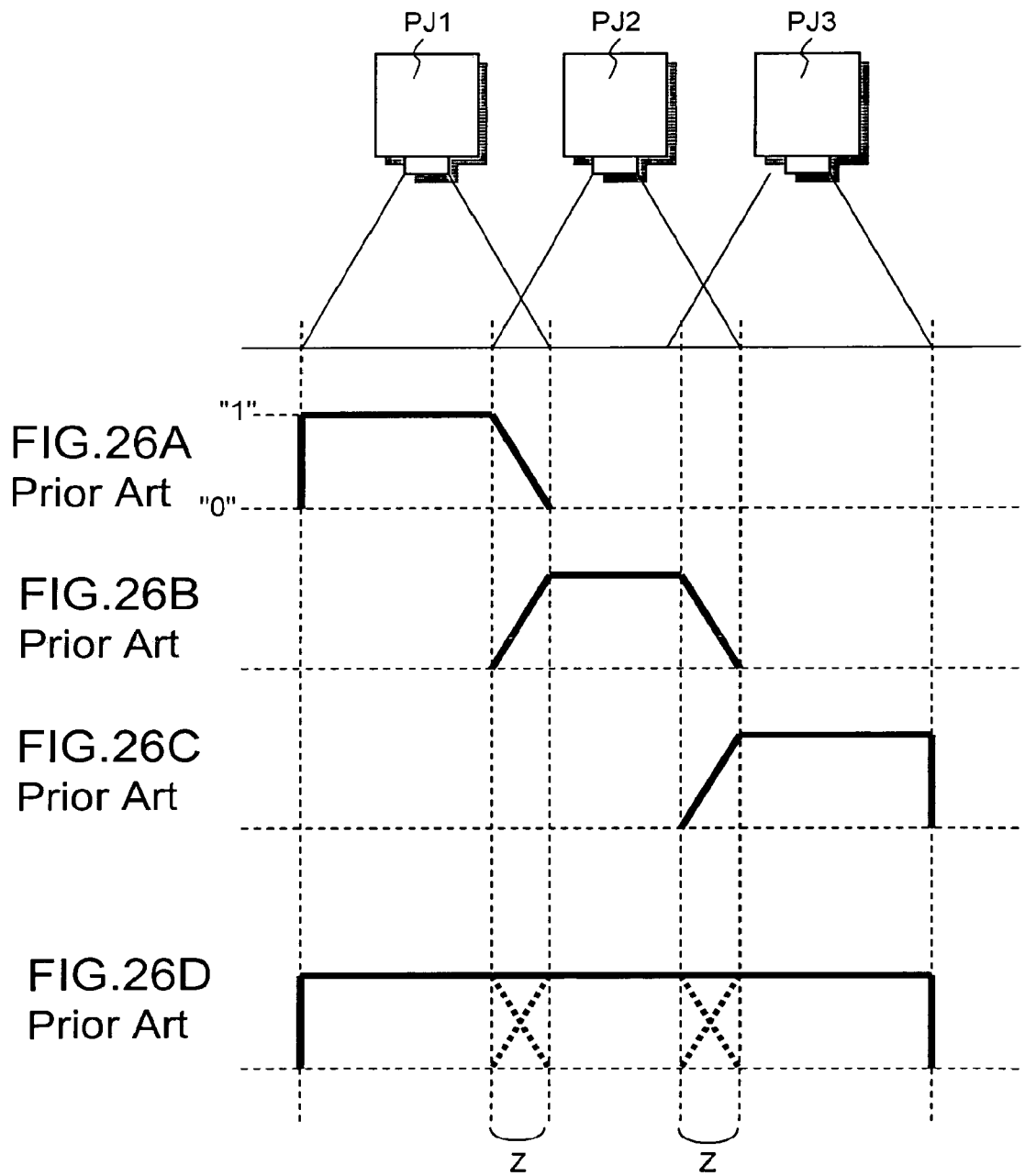

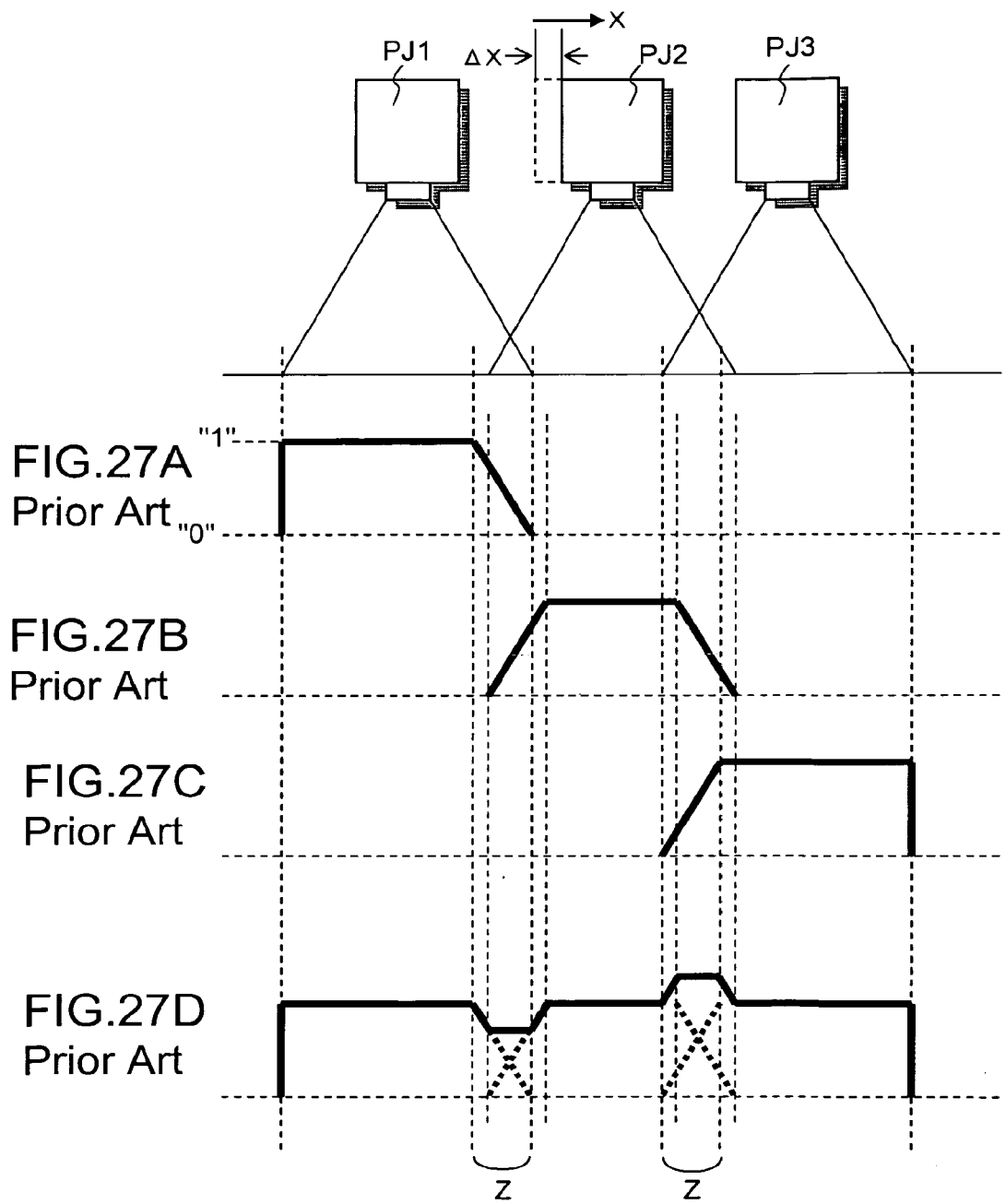

IMAGE DISPLAY CONTROL METHOD, APPARATUS FOR CONTROLLING IMAGE DISPLAY, AND PROGRAM FOR CONTROLLING IMAGE DISPLAY

BACKGROUND

Exemplary aspects of the present invention relate to image display control methods, image display control apparatus, and image display control programs adapted to display a large-screen image and/or high-resolution image by arranging plural image projection units and projecting partial images from the projection units.

The size of a display provided by a related art single display unit and the resolution of the display have limitations. Related art methods and apparatus for arranging and using plural image display control units to achieve a large screen exceeding the limitation or a display of high resolution exceeding the limitation are available. At this time, a method of how to make unnoticeable the boundaries between the displays provided by the individual display units to provide one natural display as a whole is a problem to be addressed and/or solved.

Related art methods of making unnoticeable the boundaries are roughly classified into two major categories: combining method and overlapping method. The feature of the composite method is that any point on the whole displayed image is displayed by any one display unit. The feature of the overlapping method is that regions capable of being displayed by the individual display units are made to overlap with each other and that a display on such overlapping regions is superimposingly provided by the plural display units.

One example of the composite method is a method using a mechanical combination. This method includes mechanically bonding together flat-panel display units (e.g., liquid crystal display units) themselves at their edges. This has the advantage that once the units have been bonded, the state is maintained stably. However, it is difficult to create a display device having bondable edges.

Another composite method uses image projection units. Images projected by image projection units are apparently combined on the surface of the display. This makes it unnecessary to bond together display units themselves and hence the apparatus has a relatively large number of degrees of freedom. However, the composite state produces error due to mechanical or electrical aging of the apparatus because mechanical bonding is not used. Furthermore, the errors greatly affect the display quality. It is difficult to maintain good state of display.

One example of the overlapping method is a method of using plural image projection units. A part of an image projected from one image projection unit is superimposed on a part of an image projected from the other image projection unit.

In particular, one output is gradually reduced in an overlapping region while the other output is gradually increased at the same time. Thus, boundary regions are connected smoothly. This overlapped state produces error due to mechanical or electrical aging of the apparatus in the same way as the composite method. However, in the overlapping method, error affects the quality of display to a lesser extent than in the composite method. However, it is difficult to control the display in the overlapping region.

These are described in further detail below with reference to the drawings.

FIG. 21 is a schematic of a related art composite method using plural (four, in this example) image projection units (such as projectors) PJ1, PJ2, PJ3, and PJ4. As shown in this FIG. 21, the image projection units PJ1, PJ2, PJ3, and PJ4 are arranged such that their respective display regions A1, A2, A3, and A4 can be displayed without overlap or gap. However, the display provided by each of the image projection units PJ1, PJ2, PJ3, and PJ4 easily deforms into an irregular quadrilateral having no right angles due to slight installation error or aging. Therefore, it is difficult to precisely arrange their display regions A1, A2, A3, and A4 in this way and to maintain the arrangement.

FIG. 22 is a schematic of a case in which the four image projection units PJ1, PJ2, PJ3, and PJ4 display the individually displayable display regions A1, A2, A3, and A4 such that there are overlapping regions Z in parts of the regions A1-A4. In this related art method, a display can be provided either by the composite method or by the composite method.

FIGS. 23A-23D show a method of providing a display by the composite method of FIG. 22. To simplify the explanation, only the three image projection units PJ1, PJ2, and PJ3 are taken into account. Also, only processing on one line is herein considered. It is assumed that the three image projection units PJ1, PJ2, and PJ3 already know what regions of the displayable display regions of the image projection units overlap with each other.

Specific related art methods for knowing the overlapping regions include methods described, for example, in JP-A-H8-294073 and JP-A-2002-238064, respectively. The method described in JP-A-H8-294073 permits the user to have a clear view of both ends of each overlapping region. The method lets the user indicate the overlapping regions, whereby the method knows them. The method described in JP-A-2002-238064 knows overlapping regions using an entry made by a camera.

FIGS. 23A-23C indicate the values of weights about displays provided by the three image projection units PJ1, PJ2, and PJ3 on some line. As shown in the figure, each weight has two values, "1" and "0". They can be quite easily implemented in software or by a circuit. Here, the weight "1" means the output value itself is responsive to some input. Also, the weight "0" means a black output. P1, P3, P4, and P6 in the figure indicate the end points of the overlapping regions. P2 and P5 indicate image division positions to carry out a composition in this example. One specific example of implementation of the method of FIG. 23 is described in JP-A-2002-277958. The sum of these weights is a constant value of "1" over the whole display region as shown in FIG. 23D.

FIGS. 24A-24D show the image projection unit PJ2 located in the center of FIGS. 23A-23D has shifted ΔX in the direction of the arrow X. At this time, summation of the weights of the displays shown in FIGS. 24A-24C, respectively, produces portions of weight 0 (i.e., black portions that provide no display) and portions of weight 2 (i.e., very bright portions because of superimposition of displays) as shown in FIG. 24D. These can be quite easily discerned visually. The quality of display deteriorates greatly.

FIGS. 23A-23D and 24A-24D assume only processing on same line. Where a two-dimensional way of thinking is introduced, more difficult circumstances will exist.

FIGS. 25A-25C illustrate this. As shown in FIG. 25A, a case in which display regions A1 and A2 of two image projection units PJ1 and PJ2 overlap with each other at an angle is disclosed. It is assumed that the display region A1 of the image projection unit (referred to as the image projection unit PJ1) displaying the left side of FIGS. 25A-25C is a region in gray color of FIG. 25A and that the display region A2 of the image projection unit (referred to as the image projection unit PJ2) displaying the right side of FIGS. 25A-25C is a region in gray color of FIG. 25B.

As shown in FIG. 25C, the display regions A1 and A2 of the both image projection units PJ1 and PJ2 overlap with each other, producing a portion (portion a1 in gray color) of excessive brightness. Also, a portion (black portion a2) that is displayed by none of the image projection units PJ1 and PJ2 exists. This is a phenomenon that cannot be avoided in the case where the minimum unit of display of the image projection units has a finite size and the displays of image projection units overlap at an angle.

FIGS. 26A-26D show a method of achieving a display provided by the overlapping method. FIGS. 26A-26C show the values of weights on some line of the displays provided by the three image projection units PJ1, PJ2, and PJ3.

As shown in FIGS. 26A-26D, one weight gradually decreases in the overlapping region, while the other increases gradually. Summation of the weights produces a constant value over the whole display region as shown in FIG. 26D.

FIGS. 27A-27D show a circumstance in which the image projection unit PJ2 located in the center of FIG. 26 has produced a positional deviation in the same way as in FIGS. 24A-24D. At this time, summation of the weights of the displays shown in FIGS. 24A-24C produces unevenness as shown in FIG. 27D. This indicates that deterioration of the display quality due to a positional deviation is smaller, as can be seen by comparison with FIGS. 24A-24D showing an example of the composite method. That is, concave portions of the weights are displayed slightly darkly. Conversely, convex portions are displayed slightly brightly. This indicates the superiority of the overlapping method over the composite method in which black and bright lines are noticed clearly as to positional deviation of image projection units.

However, it is not so straightforward to connect images in the overlapping regions smoothly, because a nonlinear relation exists between the input to each image projection unit and the display output (output brightness) due to gamma correction to adjust the nonlinear characteristics of the human perception.

FIG. 28 is a schematic of the aforementioned nonlinear relation between the input and output. In particular, the human perception has logarithmic characteristics. Where a proportional relation is created between the input and the output brightness, it follows that variations in the output brightness are felt to be greater at small inputs while variations in the output brightness are felt to be smaller at large inputs. As a result, as shown in FIG. 29, it is not felt that twice of the value of the output brightness when the input value is 127, for example, is a value close to the output brightness when the input value is 255. Therefore, in a normal display device, the correspondence between the input and output brightness is often set to a function inverse to a function as shown in FIG. 28 such that the value of the brightness perceived by a human approaches the input value. Specifically, the function of FIG. 28 is upwardly convex. As a function inverse to this function of FIG. 28, a downwardly convex relation is often set.

The effects of the nonlinearity are particularly shown in FIGS. 30A and 30B. As shown in FIG. 30A, it is assumed that an input value to be displayed (i.e., output value) is constant. In this case, if the sum of input values to the respective image projection units in the overlapping region is made constant, the sum of the output values decreases in the overlapping region as shown in FIG. 30B, for the following reason. As described previously, a downwardly convex nonlinear relation exists between the input value and output value as an inverse function to the function of FIG. 28.

FIGS. 31A and 31B illustrate a method of correcting this and making constant the output value over the overlapping region. To make constant the output value as shown in FIG. 31B, it is necessary to gradually nonlinearly increase or reduce the input to each image projection unit in the overlapping region as shown in FIG. 31A. The nonlinearity depends on the function shown in FIG. 28. The function varies depending on the value of the gamma adjustment or the nonlinearity of other component. Furthermore, the nonlinearity changes depending on user's change of settings or varies due to aging characteristics. Accordingly, in order to control the sum of the output values to a desired value, it is necessary to perform nonlinear processing including many parameters.

SUMMARY

A method and apparatus to control image display by the composite method (e.g., as disclosed in the above-described JP-A-2002-277958) can achieve a display using plural image projection units by processing that is very simple in software or hardware. However, there is the problem that slight installation error greatly deteriorates the display quality.

A method and apparatus to control image display by the overlapping method (e.g., as disclosed in JP-A-H8-294073 and JP-A-2002-238064) have the advantage that installation error produces less deterioration of the display quality. Specifically, they provide higher resistance to installation error. However, there is the problem that processing for overlap of images needs to be carried out in more complex software or hardware.

Exemplary aspects of the present invention address and/or solve these and/or other problems. It is an object of the invention provide image display control methods, image display control apparatus, and image display control programs to achieve resistance to image quality deterioration caused by installation error comparable to the overlapping method by simple processing in software or hardware comparable to the composite method.

(1) A method of controlling image display in accordance with an exemplary aspect of the present invention prepares plural image projection units capable of producing projected display regions, respectively, installs the image projection units such that overlapping regions are formed in parts of the projected display regions, sets a given division position within each of the overlapping regions such that only a partial image from any one of the image projection units is displayed in the overlapping region when the image projection units project their respective partial images, and performs an image division at the division position to thereby create a whole image. The method includes: creating the division position such that the division position varies at a given timing; and dividing the image within the overlapping region at the division position created by creating the division position.

In this way, in an exemplary aspect of the present invention, the division positions within the overlapping regions are varied at given timing. Specifically, the exemplary aspect of the invention uses a dynamic composite method in which the division positions are varied with time. This is equivalent to a static composite method at each instant of time. Where a time average is taken, the method is equivalent to the overlapping method.

Consequently, even if any image projection unit has produced a positional deviation, variation in brightness caused by the positional deviation is distributed in terms of time and can be suppressed to an unnoticeable level. Furthermore, the processing of the present exemplary aspect of the invention dispenses with nonlinear processing, and can be realized with simple calculations equivalent to the related art composite method.

(2) In the method of controlling image display as set forth in (1) above, in a case where the image projection units are image projection units using optical switching elements, as its optical control elements, giving a digital grayscale representation based on On/Off times, the given timing is set so that On times necessary to represent some grayscale are successively assigned to the image projection units having mutually overlapping regions within a time for which the optical switching elements represent the grayscale.

For example, in the case of a binary display apparatus, such as Texas Instrument's DMD (DIGITAL MICROMIRROR DEVICE) which turns on and off reflection of light to a certain direction by variations in the angle of ultraminiature light-reflecting plates, the grayscale is represented by pulse width modulation or the like at a field rate exceeding the frame rate or a subfield rate obtained by further dividing the field rate. In this case, it is desired that timing corresponding to the subfields be used as display timings to facilitate the processing.

(3) Another method of controlling image display in accordance with an exemplary aspect of the present invention prepares plural image projection units capable of producing projected display regions, respectively, installs the image projection units such that overlapping regions are formed in parts of the projected display regions, sets a given division position within each of the overlapping regions such that only a partial image from any one of the image projection units is displayed in the overlapping region when the image projection units project their respective partial images, and performs an image division at the division position to thereby create a whole image. The method includes: creating divided images corresponding to given display regions that the plural image projection units can respectively display such that adjacent ones of the divided images have the mutually overlapping regions; creating masking data to provide a mask of a given range set within each of the overlapping regions between the adjacent divided images such that the given division position set within each of the overlapping regions between adjacent ones of the divided images created by creating the divided images varies at a given timing; and masking a given range within each of the overlapping regions between the adjacent divided images by the masking data created by creating the masking data.

For this purpose, the divided images corresponding to the given display regions that can be respectively displayed by the image projection units are first separately created such that the adjacent divided images have mutually overlapping regions. The given ranges within the overlapping regions between the adjacent ones of the created, divided images are masked such that the given division positions set within the overlapping regions between the adjacent divided images vary at given timing.

Thus, if any image projection unit produces a positional deviation, variation in the brightness caused by the positional deviation is distributed in terms of time and can be suppressed to an unnoticeable level, in the same way as in exemplary aspect of the invention (1) above. Furthermore, the masking processing of the exemplary aspect of the invention only requires setting of binary data indicating whether an image is displayed or not. Hence, the method can be achieved with quite simple calculational processing.

(4) An image display control method may be based on (3) above and further characterized in that the given display regions that the plural image projection units respectively display are maximum display regions given to the plural image projection units, respectively.

In this way, divided images of the maximum display regions possessed by the image projection units, respectively, are first created. The partial images in the maximum display regions are masked. In consequence, the processing is facilitated.

(5) An image display control method may be based on (3) or (4) above and further characterized in that adjusting the images divided by creating the divided images is carried out immediately before creating the masking data.

This makes it unnecessary to perform image adjusting processing involving a large amount of calculation at every timing of display. The amount of calculation necessary for adjustment can be reduced greatly. Specifically, in an exemplary aspect of the present invention, the images divided into the maximum display regions that might be given to their respective image projection units are adjusted (e.g., divided images adjusted in shape or color according to the characteristics of the individual image projection units and installation conditions). The adjusted partial images may be subsequently masked or otherwise processed. Therefore, the amount of calculation can be made much smaller than in the case where image adjustment is made at every timing of display.

(6) An image display control method may be based on any one of (3) to (5) above and further characterized in that the masking data can form nonlinear ends.

By making the masking ends nonlinear (e.g., saw-toothed shape or wavy shape) in this way, the division positions varying with time can be made less noticeable.

(7) An image display control method may be based on any one of (3) to (6) above and further characterized in that the masking data can form a random number pattern.

This can also make less noticeable the division position varying with time. Furthermore, the masking ends may be made nonlinear and, at the same time, the masking data may form a random number pattern.

(8) An apparatus to control image display in accordance with an exemplary aspect of the present invention has plural image projection units capable of producing projected display regions, respectively. The image projection units are installed such that overlapping regions are formed in parts of the projected display regions. A given division position is set within each of the overlapping regions such that only a partial image from any one of the image projection units is displayed in the overlapping region when the image projection units project their respective partial images. An image division is performed at the division position to thereby create a whole image. The apparatus includes: a division position creation unit to create the division position such that the division position varies at a given timing; and an image division unit to divide an image within the overlapping region at the division position created by the division position creation unit.

This image display control apparatus produces the same advantages as the image display control method set forth in (1) above.

(9) A further apparatus to control image display in accordance with an exemplary aspect of the present invention has plural image projection units capable of producing projected display regions, respectively. The image projection units are installed such that overlapping regions are formed in parts of the projected display regions. A given division position is set within each of the overlapping regions such that only a partial image from any one of the image projection units is displayed in the overlapping region when the image projection units project their respective partial images. An image division is performed at the division position to thereby create a whole image. The apparatus includes: an image division unit to create divided images corresponding to given display regions that the plural image projection units can respectively display such that adjacent ones of the divided images have mutually overlapping regions; a masking data creation unit to create masking data to provide a mask of a given range within each of the overlapping regions between the adjacent divided images such that the division position within each of the overlapping regions between adjacent ones of the divided images created by the image division unit varies at given timing; and an image data masking processing unit to mask the given range within each of the overlapping regions between the adjacent divided images by the masking data created by the masking data creation unit.

This image display control apparatus produces the same advantages as the image display control method set forth in (3) above.

(10) A program to control image display in accordance with an exemplary aspect of the present invention is used with plural image projection units capable of producing projected display regions, respectively. The image projection units are installed such that overlapping regions are formed in parts of the projected display regions. A given division position is set within each of the overlapping regions such that only a partial image from any one of the image projection units is displayed in the overlapping region when the image projection units project their respective partial images. An image division is performed at the division position to thereby create a whole image. The program includes: a procedure of creating the division position such that the division position varies at a given timing; and a procedure of dividing an image within each of the overlapping regions at the division position created by the procedure of creating the division position.

This image display control apparatus produces the same advantages as the image display control method set forth in (1) above.

(11) Another program to control image display in accordance with an exemplary aspect of the present invention is used with plural image projection units capable of producing projected display regions, respectively. The image projection units are installed such that overlapping regions are formed in parts of the projected display regions. A given division position is set within each of the overlapping regions such that only a partial image from any one of the image projection units is displayed in the overlapping region when the image projection units project their respective partial images. An image division is performed at the division position to thereby create a whole image. The program includes: a procedure of creating divided images corresponding to given display regions that the plural image projection units can respectively display such that overlapping regions are formed between adjacent ones of the divided images; a procedure of creating masking data to provide a mask of a given range within each of the overlapping regions between the adjacent divided images such that the given division position set within each of the overlapping regions between adjacent ones of the divided images created by the procedure of dividing the image varies at given timing; and a procedure of masking the given range within each of the overlapping regions between the adjacent divided images by the masking data created by the procedure of creating the masking data.

This image display control program produces the same advantages as the image display control method set forth in (3) above.

Furthermore, in the image display control apparatus set forth in (8) above and the image display control program set forth in (10) above, the given timing can be made a timing of display of the plural image projection units, in the same way as the image display control method set forth in (1) above. Similarly, where the image projection units are image projection units using optical switching elements representing a digital grayscale based on On/Off times, the given timing can be made a timing at which the image projection units having mutually overlapping regions have successively assigned On times necessary for the representation of some grayscale within the time in which the optical switching elements represent the grayscale.

Furthermore, in the image display control apparatus set forth in (9) above and the image display control program set forth in (11) above, the given display regions that can be displayed by the respective image projection units are set as maximum display regions that the image projection units possess, respectively, in the same way as in the image display control method set forth in (3) above. In addition, the images divided by the image division units or the procedure of dividing the images are adjusted immediately before creating the masking data. The masking data may be data forming non-linear edges or data forming a random number pattern.

In the image display control apparatus set forth in (9) and the image display control program set forth in (11) above, the given timing can be made timing corresponding to the display timings of the plural image projection units, in the same way as the image display control method set forth in (1) above. Similarly, where the image projection units are image projection units using optical switching elements representing a digital grayscale based on On/Off times, the given timing can be made a timing at which the image projection units having mutually overlapping regions have successively assigned On times necessary for some representation of the grayscale within the time in which the optical switching elements represent the grayscale.

BRIEF DESCRIPTION OF THE DRAWINGS

FIGS. 17A-17F are charts illustrating one example of grayscale representation achieved using an optical switching element (DMD);

FIGS. 18A and 18B are charts illustrating an example in which gradation level 21 is represented using the optical switching element (DMD);

FIGS. 19A-19C are charts illustrating an example in which division positions are created using the grayscale representation shown in FIG. 18A;

FIGS. 20A-20E are charts illustrating an example in which division positions are created using the grayscale representation shown in FIG. 18B;

FIGS. 23A-23D are charts illustrating an example of weighting using the related art composite method;

FIGS. 26A-26D are charts illustrating an example of weighting using the related art overlapping method;

FIGS. 27A-27D are charts illustrating variations in weight in a case where the centrally located image projection unit has produced a positional deviation under the state of FIGS. 26A-26D;

DETAILED DESCRIPTION OF EXEMPLARY EMBODIMENTS

Exemplary embodiments of the present invention are hereinafter described in detail. The exemplary embodiments include descriptions of image display control methods, image display control apparatus, and image display control programs to create a whole image by setting given division positions within overlapping regions between partial images projected respectively by plural image projection units such that only any one partial image is displayed in each overlapping region and dividing the images at the division positions when the image projection units project their respective partial images. The image projection units are installed such that the overlapping regions are present in parts of the projected display regions. It is assumed in the exemplary embodiments that the image projection units are projectors.

Exemplary Embodiment 1

Figure 1:
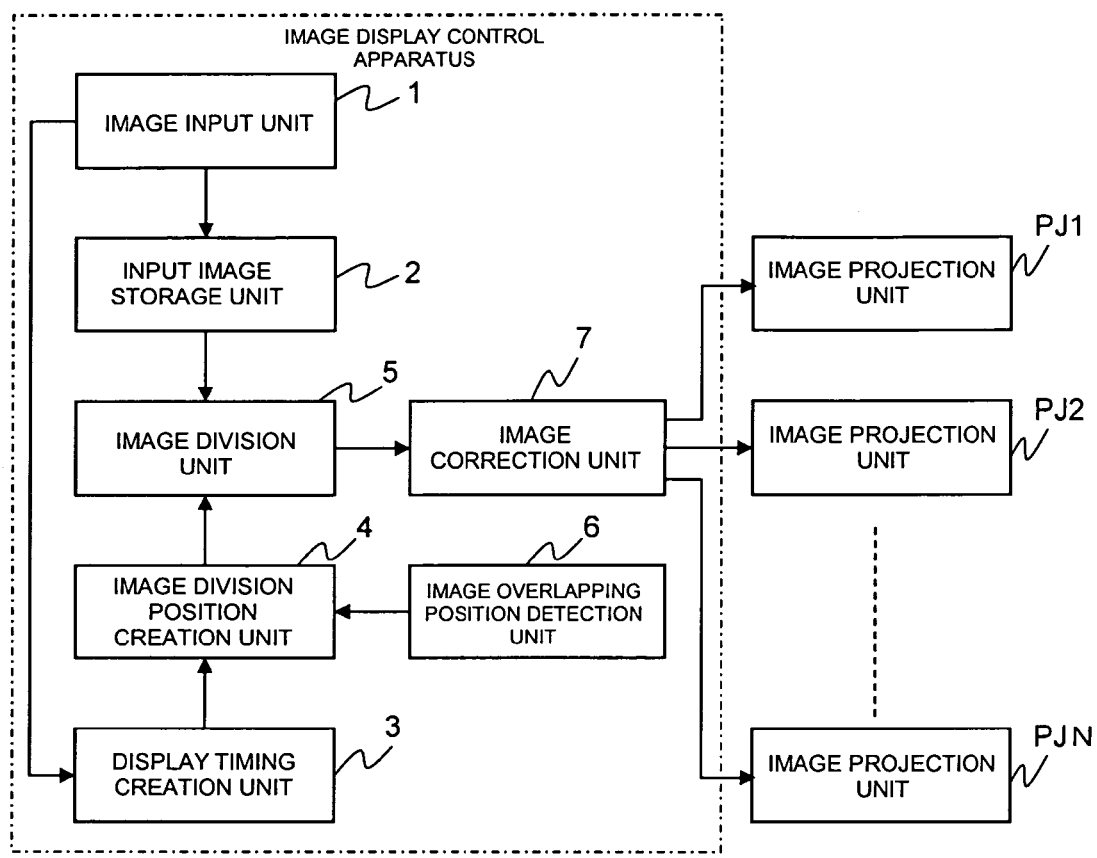
FIG. 1 is a schematic illustrating the configuration of Embodiment 1 of the present invention.

FIG. 1 is a schematic illustrating the configuration of exemplary Embodiment 1 of the present invention. The portion surrounded by the dot-and-dash line of FIG. 1 shows the configuration of exemplary Embodiment 1 of an image display control apparatus of the invention.

An image entered from an image input unit 1 and to be processed is once held by an input image storage unit 2. Meanwhile, display timings are set by a display timing creation unit 3.

The setting of the display timing may be set to an appropriate time interval, such as a standard time interval for moving pictures, such as 1/60 second, 1/30 second, or 1/24 second in a case where the image entered by the image input unit 1 and to be processed is a still image. Furthermore, where the input images are moving pictures, a time interval corresponding to the frame rate set for the images or a frame rate that is a multiple integral of such a frame rate may be used. In addition, where the image projection units use optical switching elements producing a digital grayscale representation based on On/Off times of light, a time interval corresponding to subfields to create the grayscale representation may be used. However, this is not an essential condition.

A division position creation unit 4 creates division positions at every display timing set, as described above, based on information derived by detecting image overlapping positions from an image overlapping position detection unit 6. The information indicates how the projected display regions from the image projection units PJ1, PJ2, ..., PJN overlap.

An image division unit 5 divides an image stored in the input image storage unit 2 at a division position created at every display timing by the division position creation unit 4. Images (referred to as divided images) divided by the image division unit 5 are adjusted in shape, color, and so on according to the characteristics of the image projection units PJ1, PJ2, ..., PJN and installation conditions by an image adjustment unit 7. Then, the divided images are sent to the image projection units PJ1, PJ2, ..., PJN and displayed as a whole image.

This is further described with reference to FIGS. 2A-2H and 3A-3H, which correspond to FIGS. 23A-23D and 26A-26D illustrating the related art. FIGS. 2A-2H illustrate the operation of an exemplary aspect of the invention while taking notice of the image projection unit PJ2 of the three image projection units PJ1, PJ2, and PJ3 having overlapping regions Z between the projected display regions. The projection unit PJ2 is located in the center.

The aforementioned display timings are indicated by t, t+1, t+2, ..., t+6 shown in (A)-(G) of FIGS. 2A-2H. P1, P2, ..., P6 shown in the figure depict examples of division positions. It is assumed in this FIGS. 2A-2H that time elapses from above to below.

For example, at display timing t, division positions shown at P2 and P5 are established. At display timing t+1, division positions shown at P1 and P4 are established. Similarly, at display timings t+3, t+4, ..., division positions are established within the overlapping regions Z.

Figure 2:
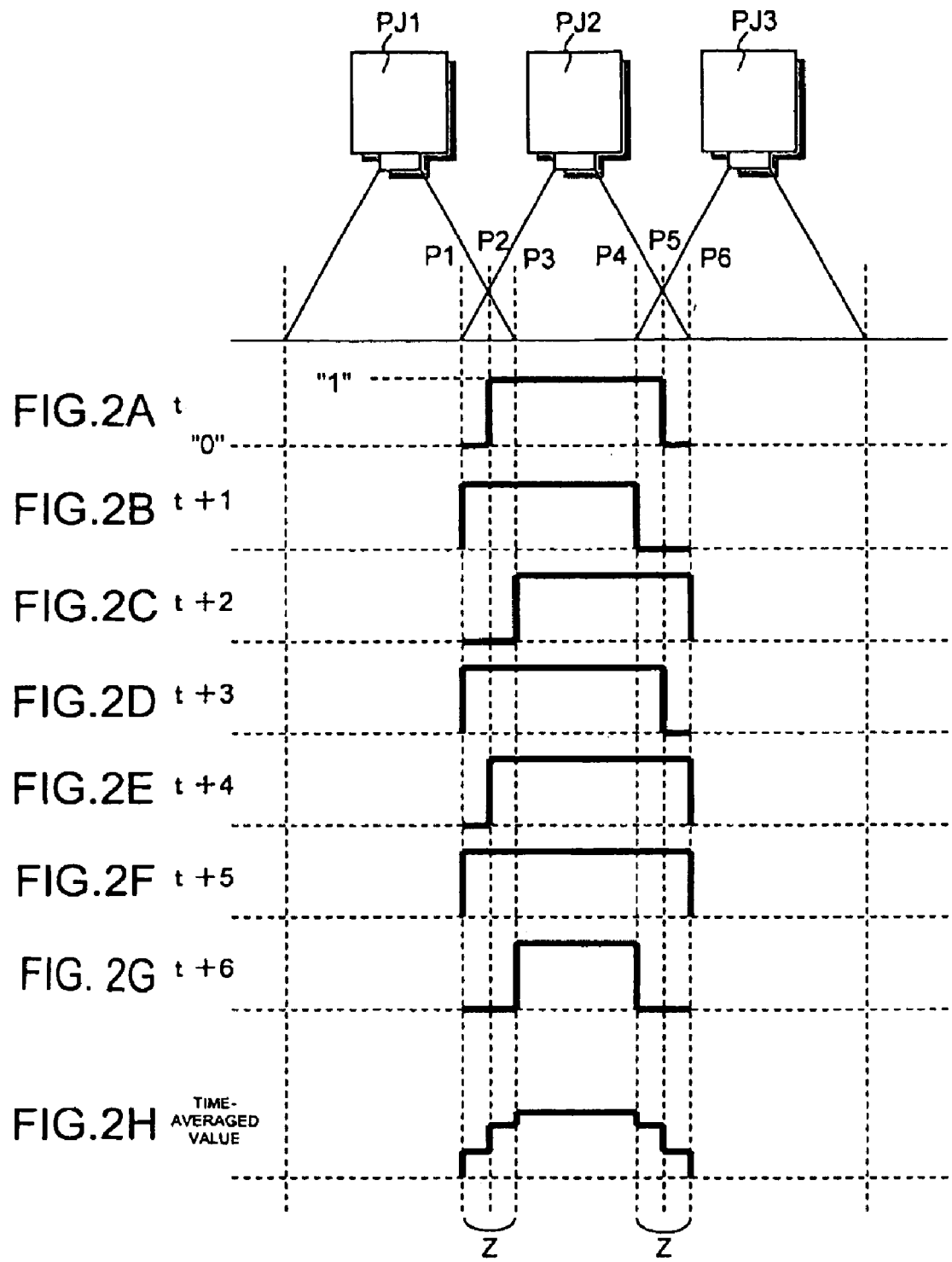
FIGS. 2A-2H are charts illustrating the operation of an image projection unit located in the center among three image projection units having projected display regions including overlapping regions while taking note of the central projection unit.

If the division positions are varied with time in this way, the time average of the weight ("1" or "0") at each division position is as shown in FIG. 2H. This indicates that at each display timing, the image display control method is equivalent to the composite method but that the time-averaged weight shows a weight distribution similar to that obtained by the overlapping method illustrated in FIGS. 26A-26D.

The division positions are created by the division position creation unit 4 within their respective overlapping regions in synchronism with the display timings after the division position creation unit 4 receives information about the positions at which images overlap from an image overlapping position detection unit 6. For example, in FIGS. 2A-2H, the image projection units PJ1 and PJ2 share one overlapping region Z. Also, the image projection units PJ2 and PJ3 share another overlapping region Z. Therefore, the division positions are set within the overlapping regions Z.

FIGS. 3A-3H illustrate a case in which division positions for the image projection units PJ1 and PJ3 located left and right of the image projection unit PJ2 shown in FIGS. 2A-2H are varied with time in synchronism with display timings t, t+1, t+2, ..., t+6, as well as the division position for the projection unit PJ2. Weighting indicated by the broken line in FIGS. 3A-3H is used for the image projection unit PJ2 and is the same as the weighting shown in FIGS. 2A-2H.

In this FIGS. 3A-3H, the division position of the image projection unit PJ1 is P2 at display timing t. The division position is P1 at display timing t+1. The division position is P3 at display timing t+2. In this way, the division position varies in synchronism with the display timing. Also, the division position of the image projection unit PJ3 is P5, P4, and P6 at display timings of t, t+1, and t+2, respectively. In this way, the division position varies in synchronism with the display timing.

Figure 3:
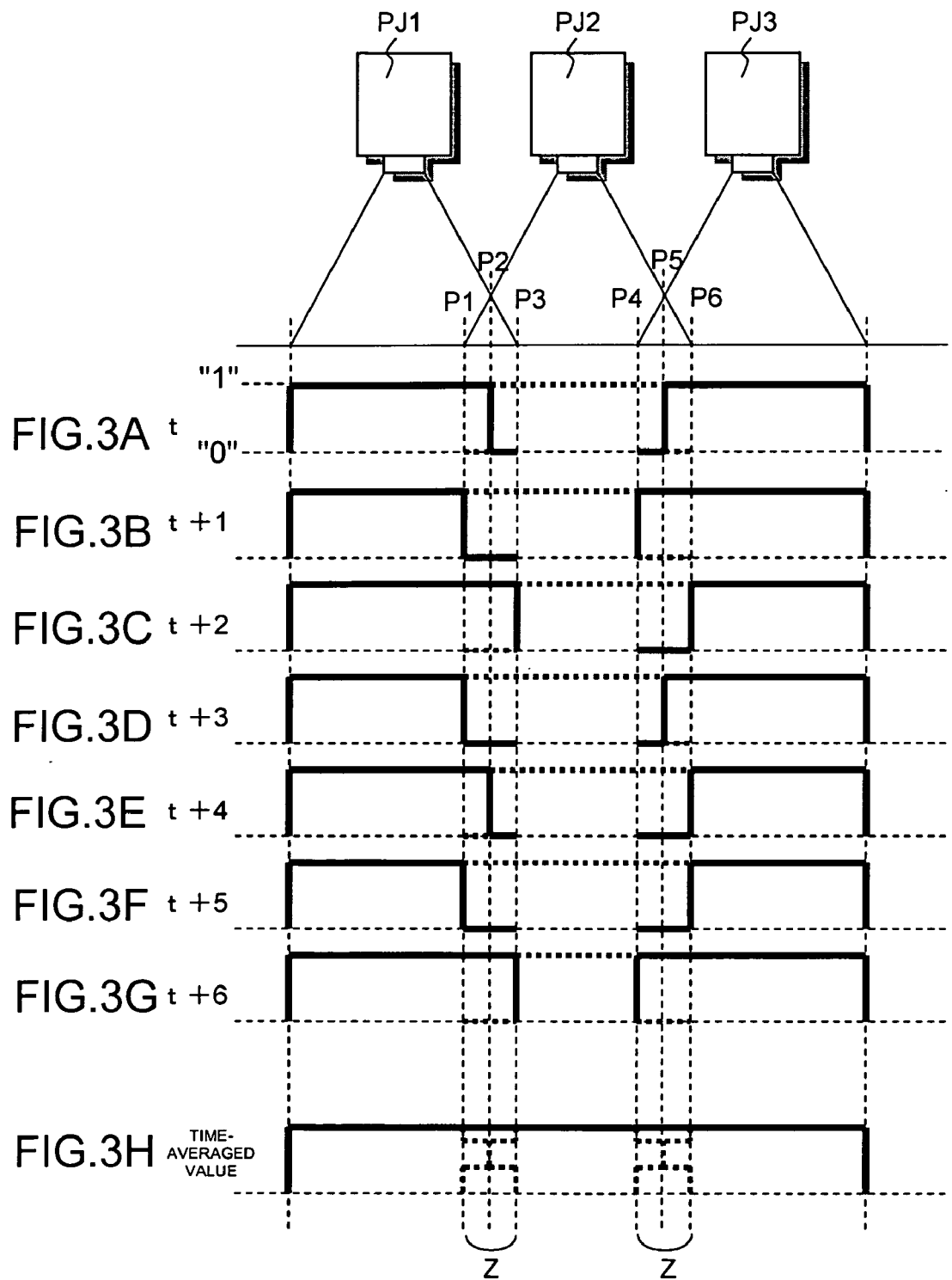
FIGS. 3A-3H are charts illustrating the operations of both adjacent image projection units in FIG. 2.

When the division positions for all the image projection units PJ1, PJ2, and PJ3 are controlled so as to vary with time in this manner, the time-averaged weight of the whole system is a constant value of 1 in the whole display region as shown in FIG. 3H.

FIGS. 4A-4G and 5A-5H are schematics illustrating the operation in a case where the division positions for the image projection units PJ1, PJ2, and PJ3 are controlled as shown in FIGS. 3A-3H and the centrally positioned image projection unit PJ2 has produced a positional deviation of $\Delta X$ in the direction of the arrow X in the figure. This circumstance of the positional deviation corresponds to FIGS. 24A-24D and 27A-27D illustrating the effect of a positional deviation in the related art.

As shown in FIGS. 4A-4G, when the projection unit PJ2 produces a positional deviation of $\Delta X$ in the direction of the arrow X, the weights at the display timings are as shown in this FIGS. 4A-4G.

Figure 4:
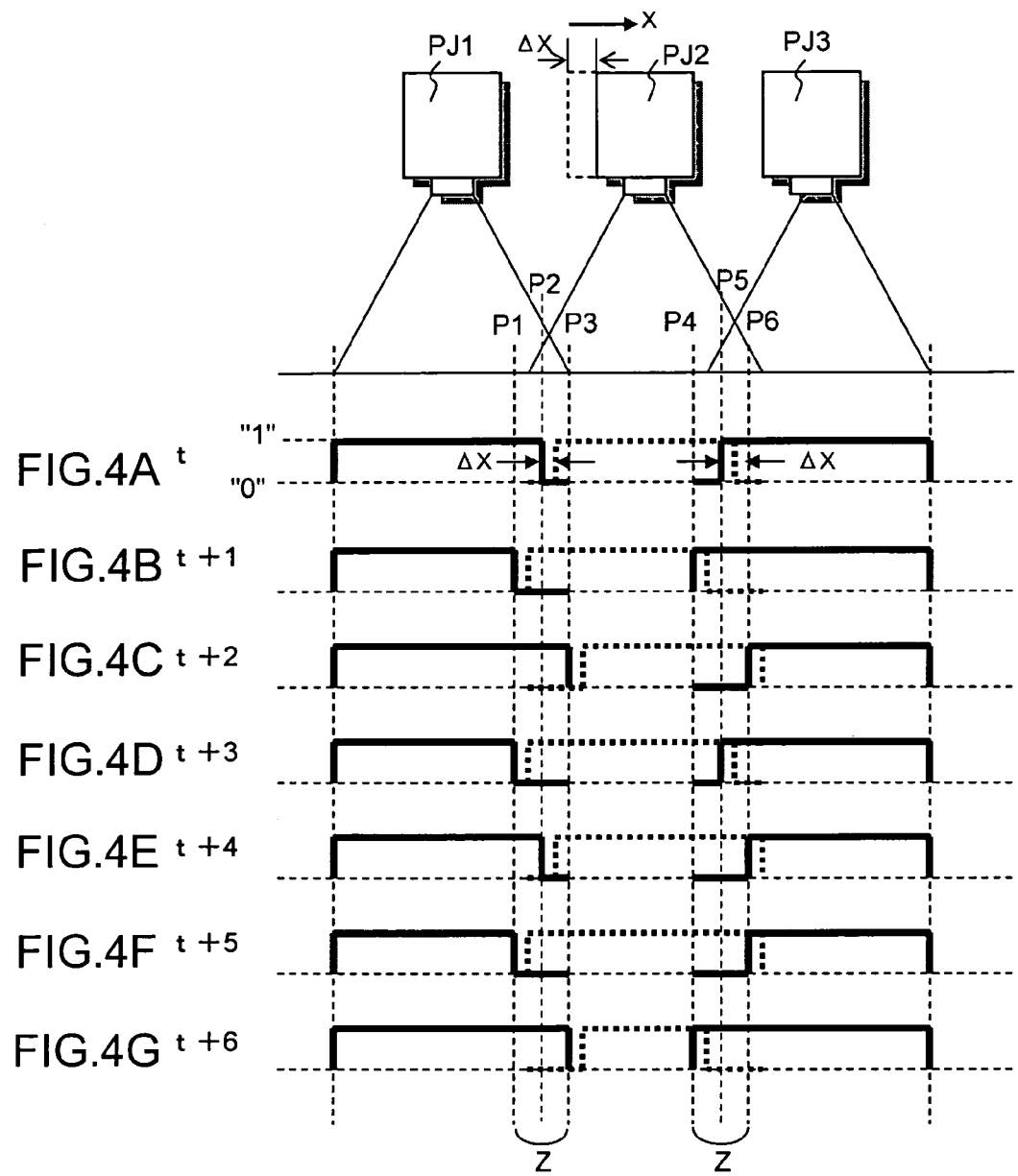
FIGS. 4A-4G are charts illustrating variations in weight in a case where the centrally located image projection unit of FIGS. 3A-3H has produced a positional deviation.

In particular, at the display timing t in FIG. 4A, a gap of $\Delta X$ is produced with respect to the division position P2 for the image projection unit PJ1. Also, at the display timing t+1 in FIG. 4B, a gap of $\Delta X$ is produced with respect to the division position P1 for the projection unit PJ1. In this way, in this case, a gap of $\Delta X$ is produced with respect to the division position at each display timing for the projection unit PJ1. With respect to the image projection unit PJ3, an overlap of $\Delta X$ is produced with respect to each of the division positions P5, P4, ... at the display timings t, t+1, ..., of the projection unit PJ3.

Figure 5:
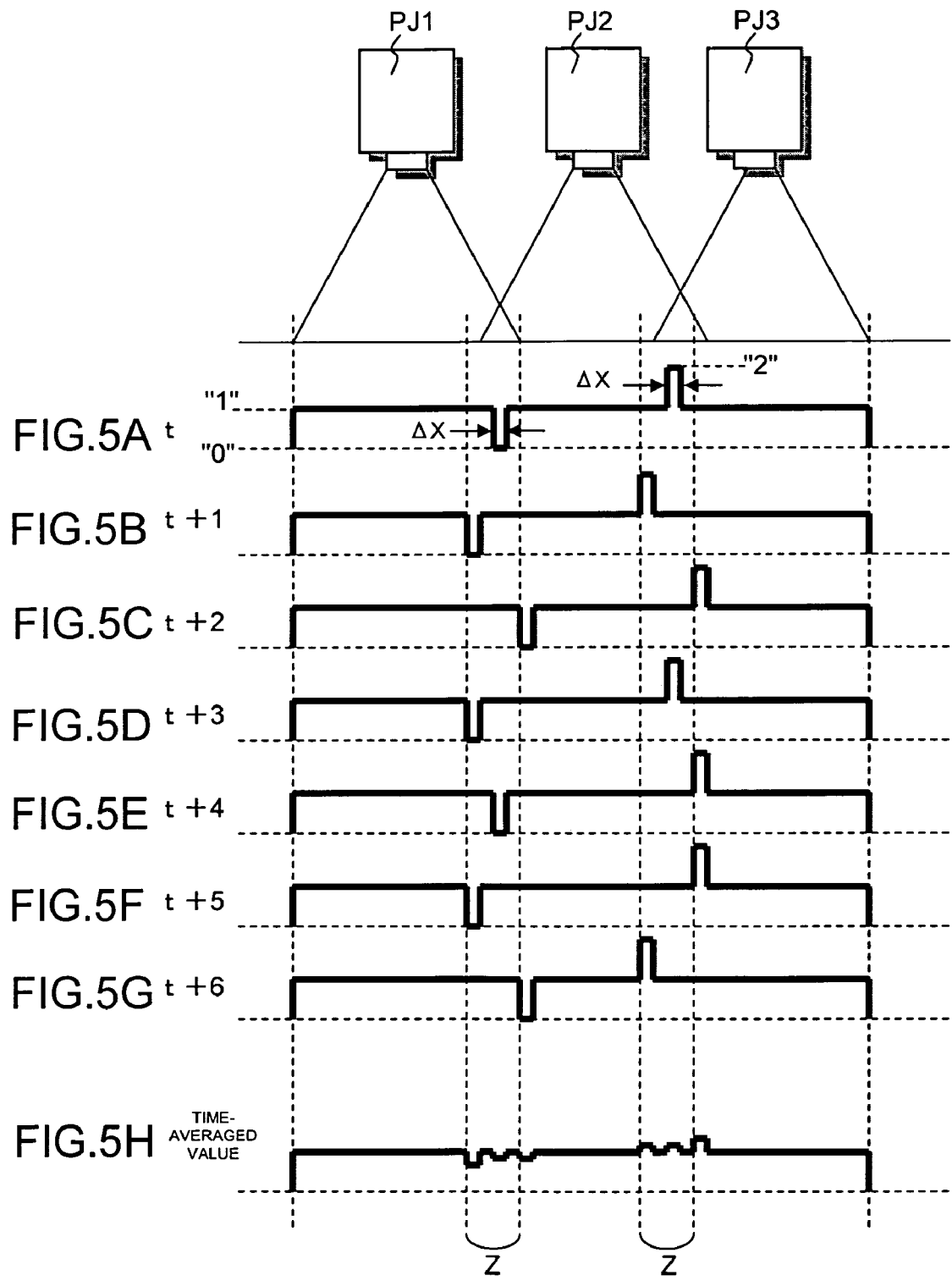
FIGS. 5A-5H are charts illustrating the time-averaged weight in the case of FIG. 4.

FIGS. 5A-5H show a composition of the weights of the image projection units PJ1, PJ2, and PJ3, respectively, shown in FIGS. 4A-4G. As shown in this FIGS. 5A-5H, at each of the display timings t, t+1, ..., a gap of $\Delta X$ (weight 0) and an overlap of $\Delta X$ (weight 2) are produced in the overlapping regions Z between the three image projection units PJ1, PJ2, and PJ3. In this way, it is certain that, at each individual timing, display quality deterioration similar to the deterioration already described in connection with FIGS. 24A-24D regarding the related art composite method occurs. In the case of the present exemplary aspect of the invention, however, deterioration due to positional deviation can be suppressed to a quite low level as shown in FIG. 5H by varying the division position with time.

FIG. 5H shows the time-averaged weight when the division positions of all the image projection units PJ1, PJ2, and PJ3 are varied with time, in the same way as in FIG. 3H. As can be seen from this FIG. 5H, image quality deterioration in the overlapping region Z between the image projection units PJ1 and PJ2 and in the overlapping region Z between the image projection units PJ2 and PJ3 can be suppressed to a quite low level.

As is obvious from the description provided so far, the processing to create division positions in the present exemplary aspect of the invention is equivalent to the composite method that can be implemented easily in software or hardware. With respect to positional deviations of the image projection units, good results comparable to the overlapping method are obtained.

This is because the composite method is a static composite method in which the division position is fixed, while the present exemplary aspect of the invention is a dynamic composite method in which the division position varies with time.

Figure 6:
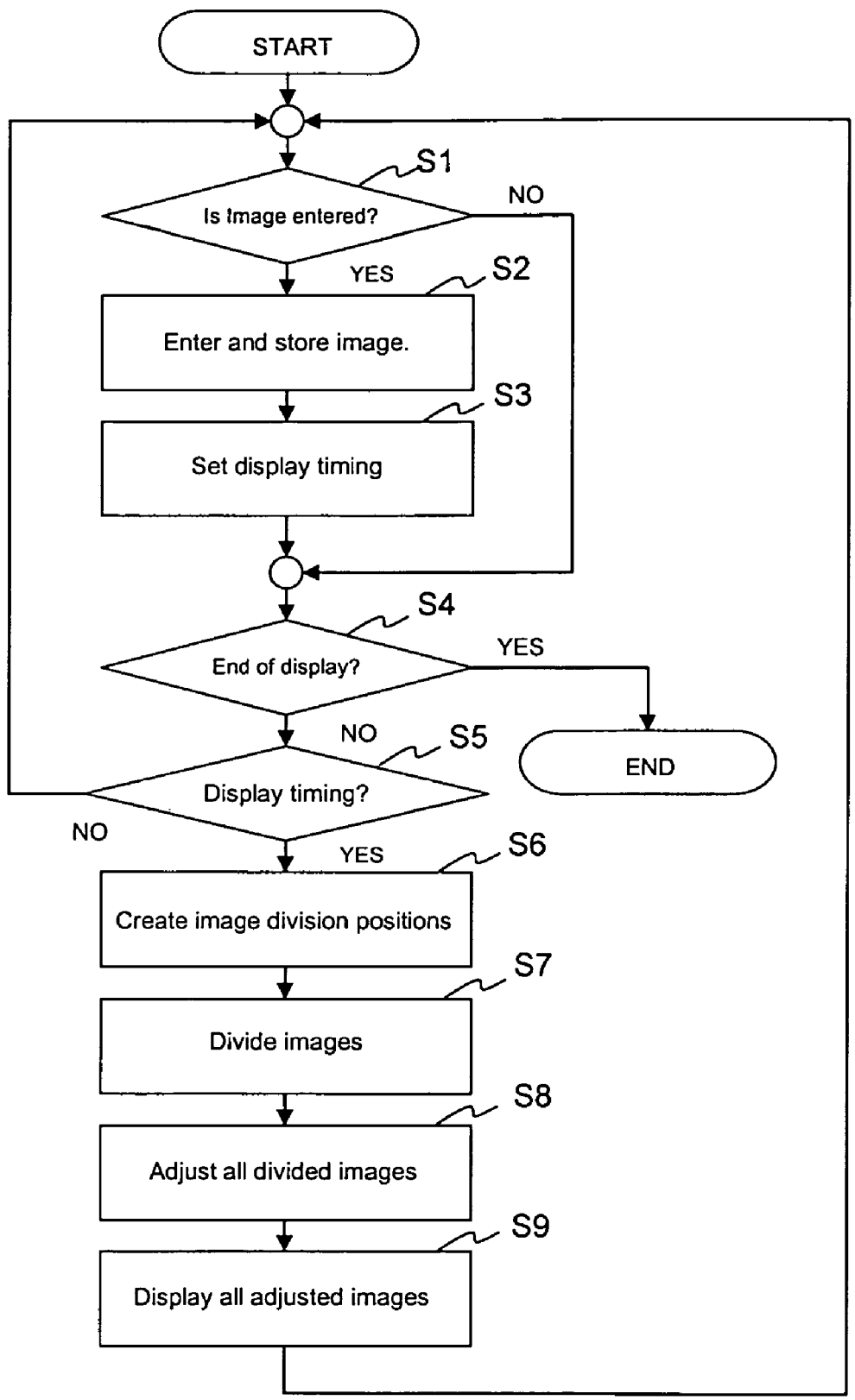
FIG. 6 is a flowchart illustrating the whole processing procedure of exemplary Embodiment 1 of the invention.

FIG. 6 is a flowchart illustrating the whole processing procedure of exemplary Embodiment 1. Since detail processing of exemplary Embodiment 1 has been already described, the whole processing procedure is now described briefly.

In FIG. 6, a decision is made as to whether an image to be processed is entered by the image input unit 1 (step S1). If the image is entered, the image is entered by the image input unit 1 and stored into the input image storage unit 2 (step S2). Subsequently, the display timing creation unit 3 sets display timings (step S3). A decision is made as to whether the display is ended or not (step S4). If the display is not ended, a decision is made as to whether it is the display timing set in step S3 (step S5). If it is the display timing, the division position creation unit 4 creates division positions about images based on information about overlaps of images from the image overlapping position detection unit 6 (step S6).

Then, the image division unit 5 divides the images based on the division positions created by the division position creation unit 4 (step S7). The image adjustment unit 7 adjusts all the divided images (step S8). All the adjusted, divided images are displayed by the respective image projection units PJ1, PJ2, ..., PJN (step S9).

It is to be understood that the processing procedure shown in this FIG. 6 merely gives an example. The order of processing is not limited to this. For example, the decision as to whether it is a display timing (step S5) can be carried out immediately before the step of displaying all the adjusted images (step S9).

Figure 7A:
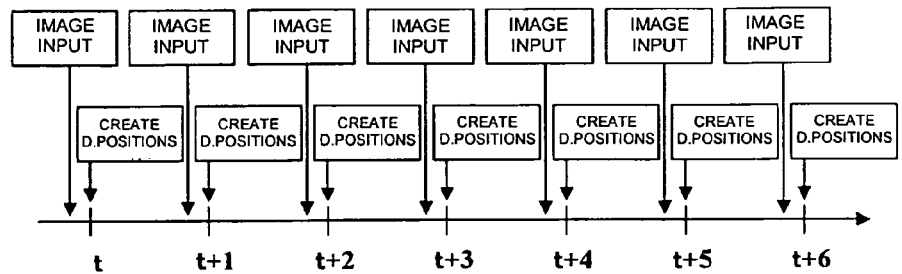
FIGS. 7A-7C are charts illustrating image input and display timings (timings of creation of division positions)
Figure 7B:
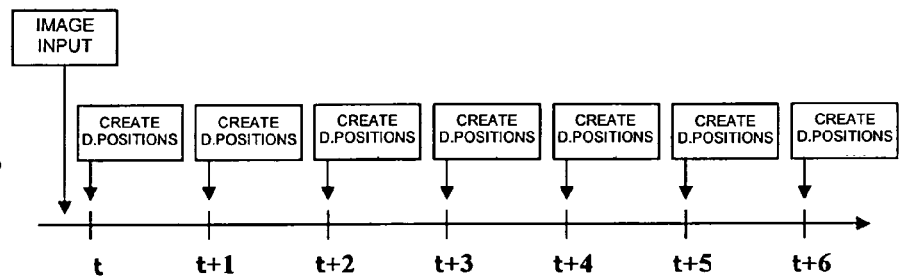
Figure 7C:
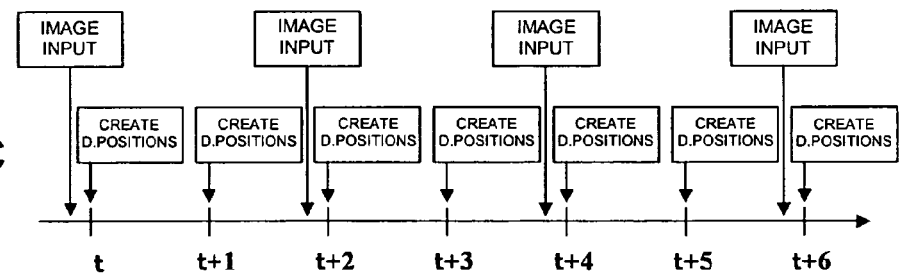

FIGS. 7A-7C illustrate the aforementioned display timings, i.e., timings at which the division positions are created. In FIG. 7A, display timings t, t+1, ... are created whenever each frame is entered in moving pictures. Division positions are created in synchronism with the display timings t, t+1, ....

FIG. 7B shows display timings for still images. Since there is no timing intrinsic to data about still images, it is necessary to create the display timings t, t+1, ... by some means or other.

In FIG. 7C, display timings are created at the double speed of the frame rate for moving pictures. For example, when a display is provided at a frame rate of about 30 frames per second, it is practically desired to create display timings t, t+1, . . . , at the double speed of the frame rate as shown in FIG. 7C or at a frequency that is an integral multiple of the frame rate (not shown here), also taking account of the possibility that the division positions are visually noticed. The division positions are created in synchronism with the display timings t, t+1, . . . .

The description provided so far pertains to processing on some line, i.e., processing for one-dimensional division position control. In practice, the division positions are controlled in two dimensions.

Figure 8:
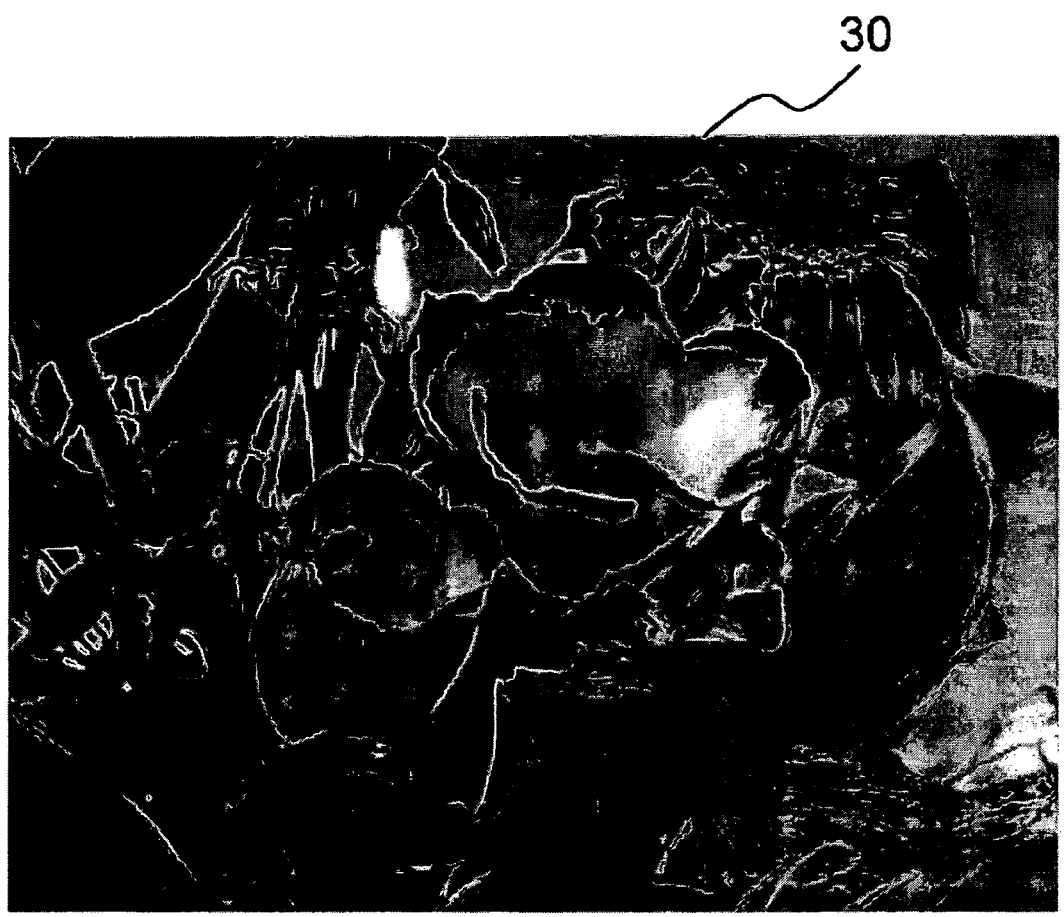
FIG. 8 shows one example of a displayed image (whole image) used in exemplary embodiments of the invention.
Figure 22:
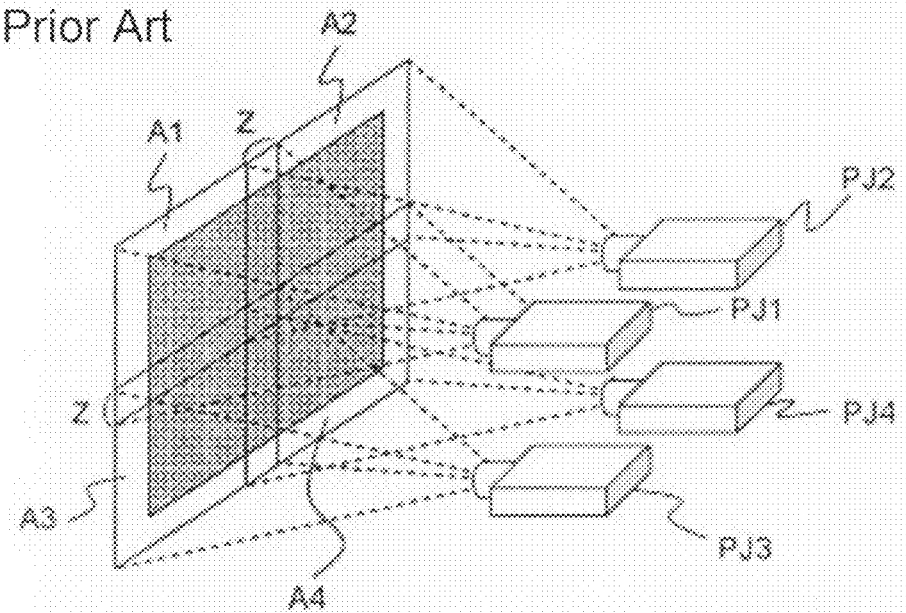
FIG. 22 is a schematic showing the configuration in a case where one whole image is created by the overlapping method, using four image projection units.
Figures 24A, 24B, 24C, 24D:
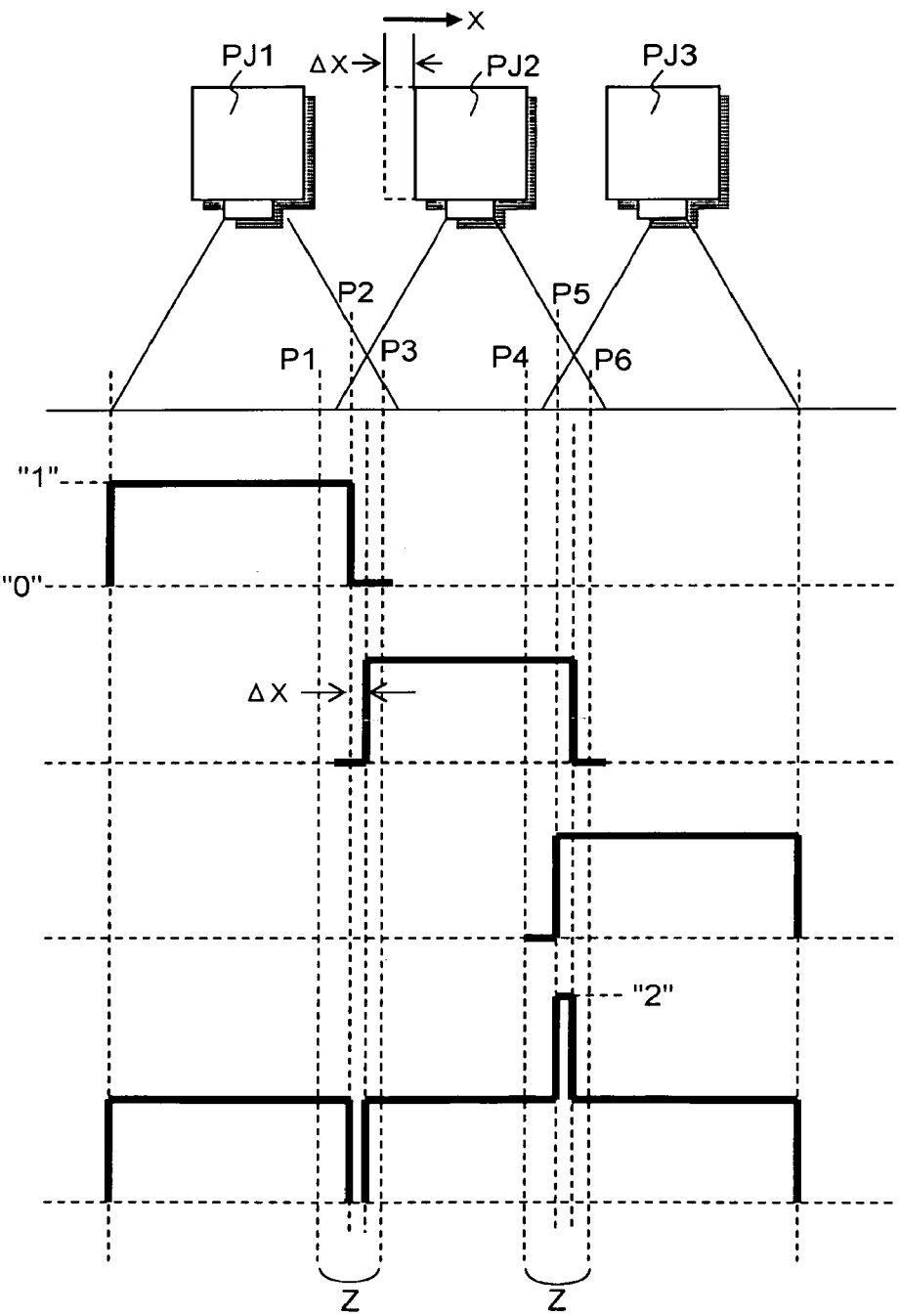
FIGS. 24A-24D are charts illustrating variations in weight in a case where a centrally located image projection unit has produced a positional deviation under the state of FIGS. 23A-23D.

FIG. 8 shows an image (referred to as the displayed image) 30 to be displayed. It is considered that this displayed image 30 is displayed by arranging four image projection units PJ1, PJ2, PJ3, and PJ4 as shown in FIG. 22.

Figure 9A:
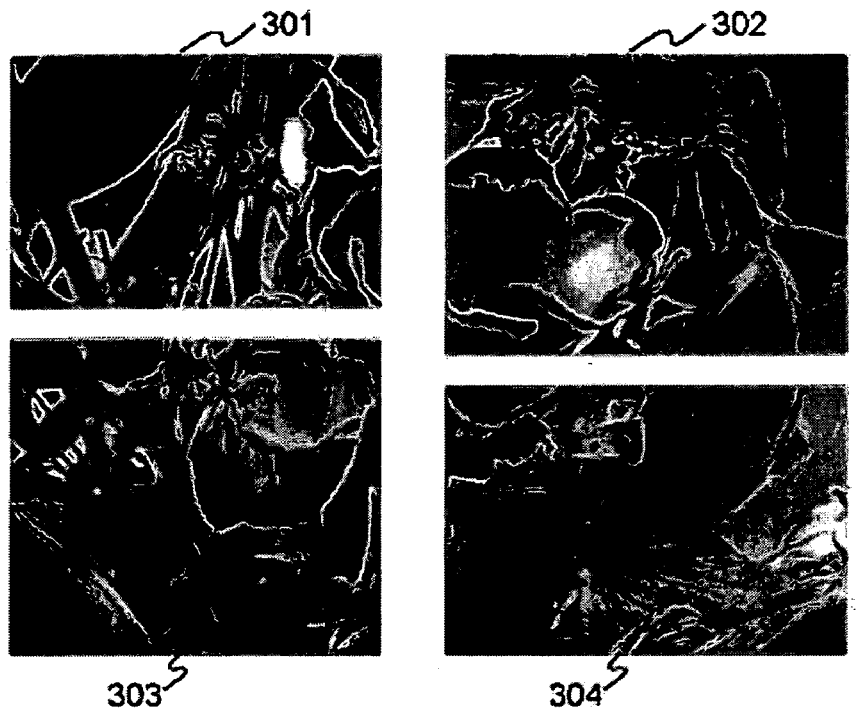
FIGS. 9A and 9B show one example of a set of divided images created by operation of exemplary Embodiment 1 in which the division positions vary dynamically.
Figure 9B:
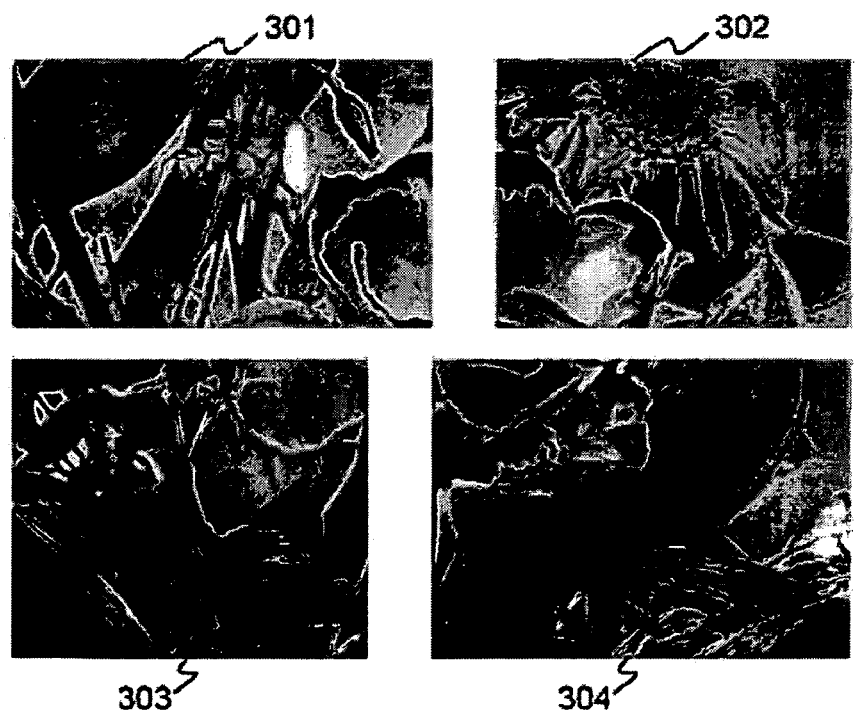

In this case, where the displayed image 30 is a moving picture sequence and the display timings are created at the frame rate, divided images are created from the displayed image 30 shown in FIG. 8 with division position different for each different frame as shown in FIGS. 9A and 9B.

In particular, as a divided image corresponding to the image projection unit PJ1, a divided image 301 with varied division position is created in synchronism with each frame as shown in FIGS. 9A and 9B. Similarly, as a divided image corresponding to the image projection unit PJ2, a divided image 302 with varied division position is created in synchronism with each frame as shown in FIGS. 9A and 9B. As a divided image corresponding to the image projection unit PJ3, a divided image 303 with varied division position is created in synchronism with each frame as shown in FIGS. 9A and 9B. Similarly, as a divided image corresponding to the image projection unit PJ4, a divided image 304 with varied division position is created in synchronism with each frame as shown in FIGS. 9A and 9B.

By realizing a dynamic composite method in which division positions are varied with time at their respective display timings in this way, even if any image projection unit produces a positional deviation, variation in brightness caused by the positional deviation can be suppressed to an unnoticeable level. Furthermore, the processing of this exemplary Embodiment 1 does not include nonlinear processing but can be accomplished by simple calculations equivalent to those of the overlapping method.

Figure 25A:
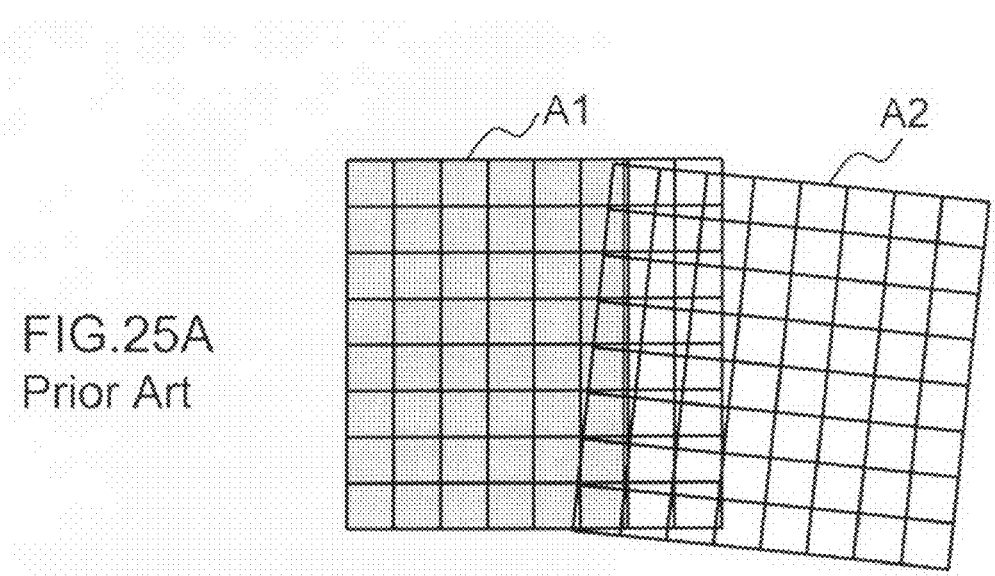
FIGS. 25A-25C are schematics illustrating a case in which a positional deviation of an image projection unit is discussed in two dimensions.
Figure 25B:
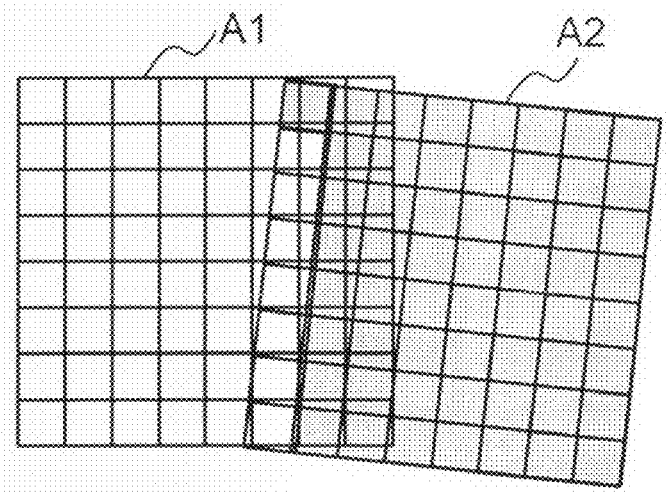
Figure 25C:
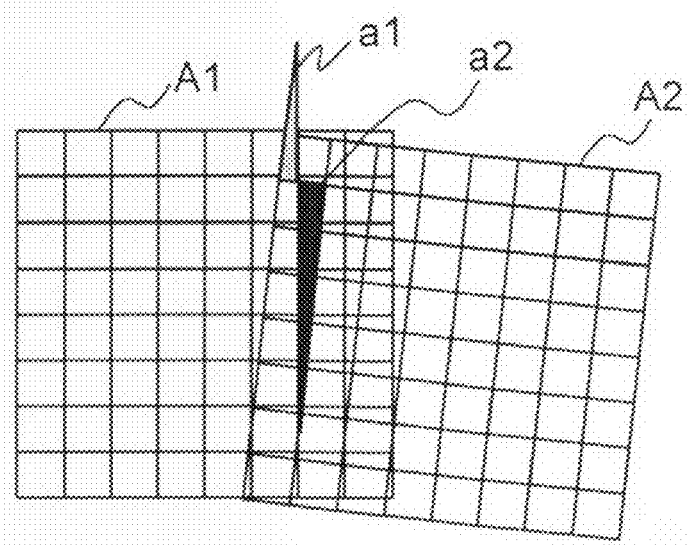
Figure 28:
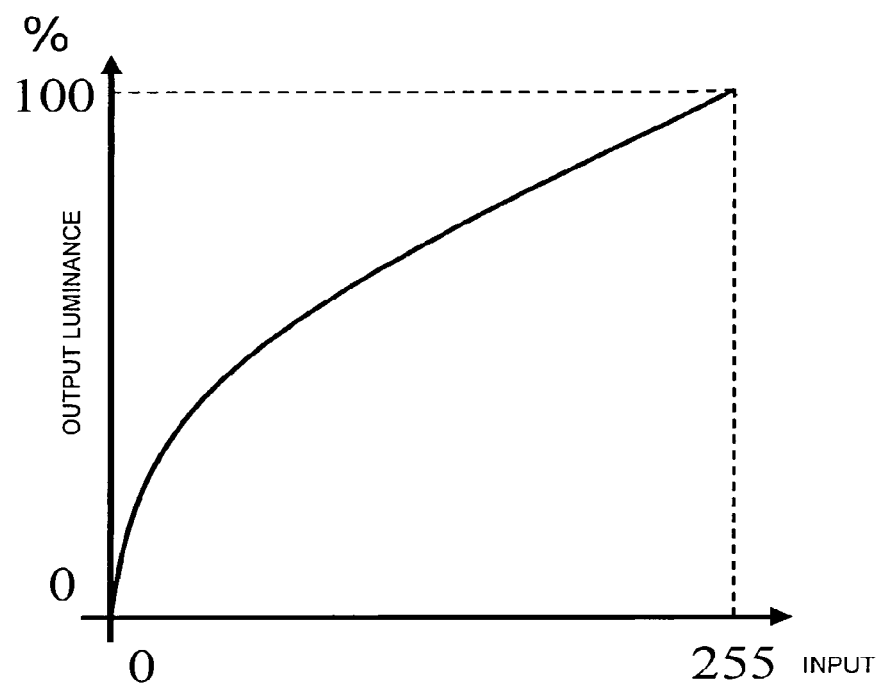
FIG. 28 is a graph illustrating a nonlinear relation between input to an image projection unit and a corresponding display output (output brightness)
Figure 29:
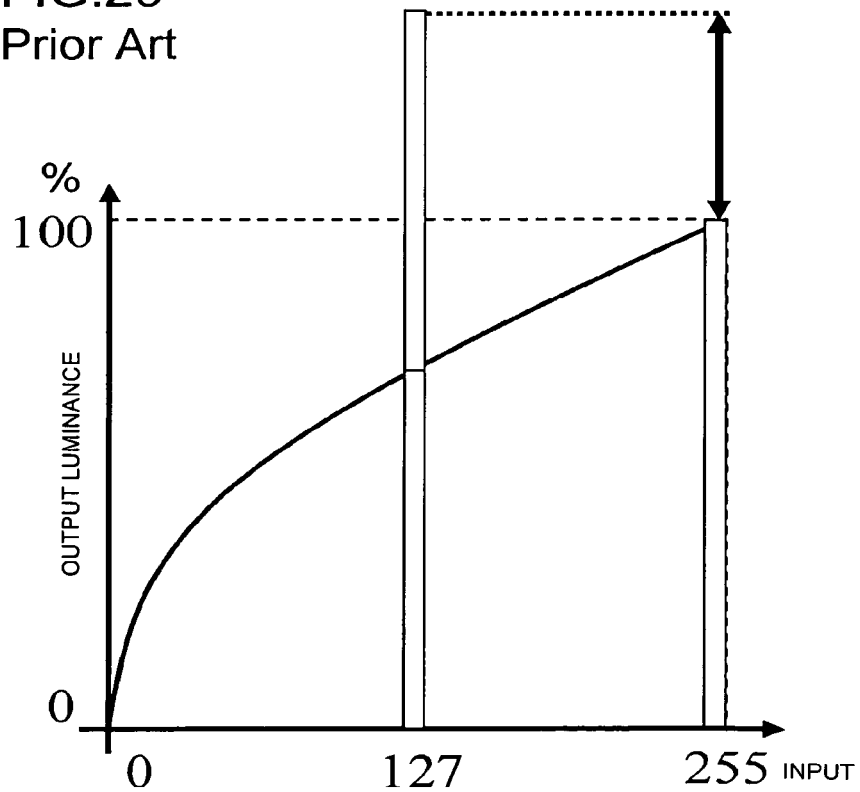
FIG. 29 is a graph illustrating the characteristics of the human perception in connection with the nonlinear relation between input to the image projection unit shown in FIG. 28 and a corresponding display output (output brightness)
Figure 30A:
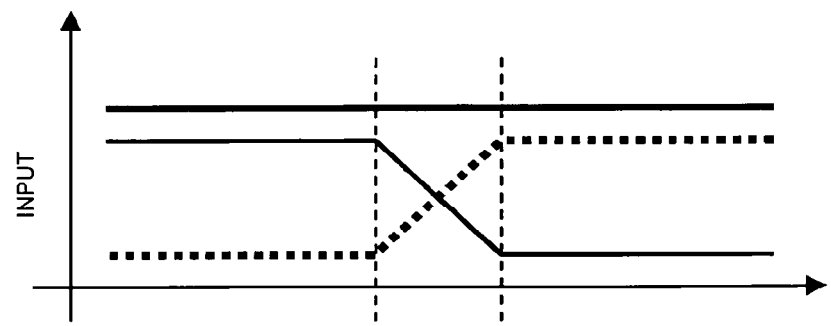
FIGS. 30A and 30B are graphs illustrating the problem with the overlapping method, the problem being caused by the nonlinear relation between input to the image projection unit shown in FIG. 28 and a corresponding display output (output brightness)
Figure 30B:
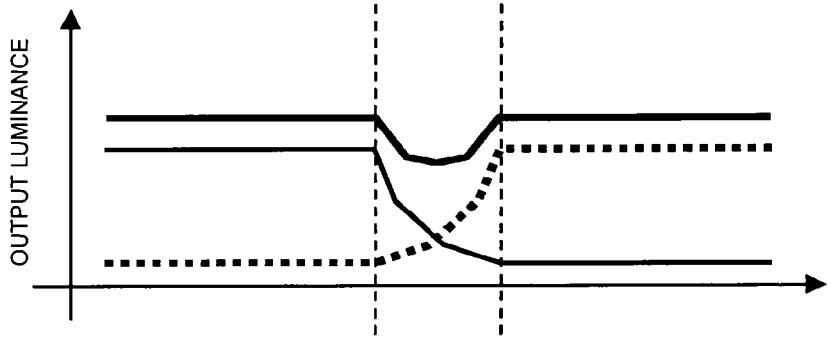
Figure 31A:
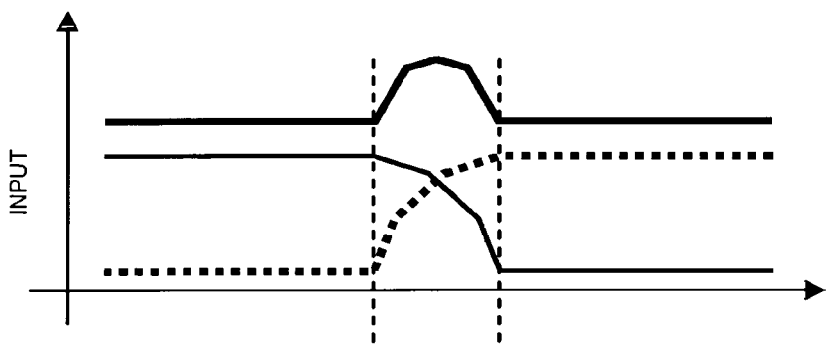
FIGS. 31A and 31B are graphs illustrating an example in which nonlinear processing is performed to address and/or solve the problem shown in FIGS. 30A and 30B.
Figure 31B:
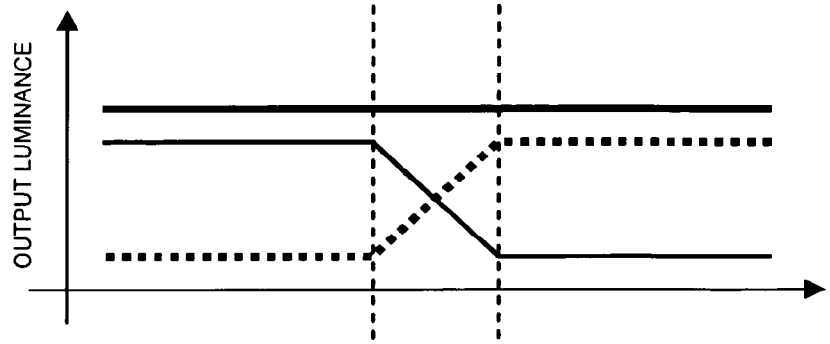

As described so far, in this exemplary Embodiment 1, dark and bright portions created by positional deviations as shown in FIGS. 24A-24D and described in connection with the related art are distributed in terms of time and made less noticeable. Furthermore, dark and bright portions produced by displays of images superimposed at angles between them as shown in FIGS. 25A-25C and described in the related art are distributed in terms of time and thus can be made less noticeable.

Exemplary Embodiment 2

This exemplary Embodiment 2 may be used for cases where still images are displayed and where moving pictures are displayed at N times the frame rate.

Figure 10:
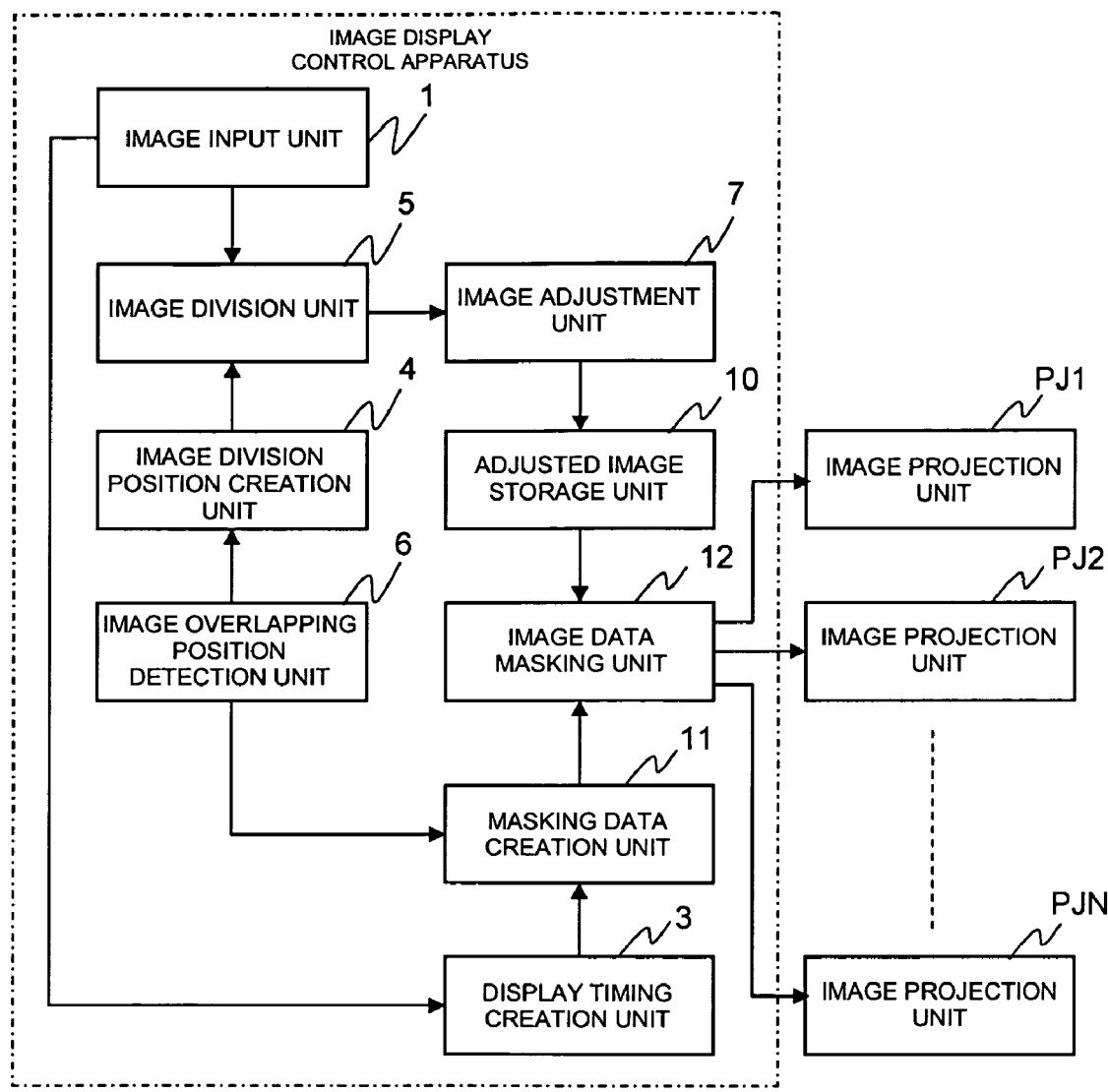
FIG. 10 is a schematic illustrating the configuration of exemplary Embodiment 2 of the present invention.

FIG. 10 is a schematic showing the configuration of exemplary Embodiment 2 of the present invention. In the same way as in FIG. 1, the portion surrounded by the dot-and-dash line of FIG. 10 shows the configuration of exemplary Embodiment 2 of the image display control apparatus of the present invention. The configuration shown in this FIG. 10 has the same components as those of FIG. 1, i.e., image input unit 1, display timing creation unit 3, division position creation unit 4, image division unit 5, image overlapping position detection unit 6, image adjustment unit 7, and image projection units PJ1, PJ2, . . . , PJN. Besides, the configuration has a adjusted image storage unit 10 to store images adjusted by the image adjustment unit 7, a masking data creation unit 11 to create masking data to mask parts of the adjusted partial images (partial images projected from the image projection units PJ1, PJ2, . . . , PJN) stored in the adjusted image storage unit 10 based on information about image overlapping positions from the image overlapping position detection unit 6, and an image data masking unit 12 for masking the adjusted partial images stored in the adjusted image storage unit 10 using the masking data created by the masking data creation unit 11.

In this FIG. 10, the input image storage unit 2 described in connection with the configuration of FIG. 1 is omitted for the following reason. In this exemplary Embodiment 2, images once divided are processed by the image adjustment unit 7 and stored in the adjusted image storage unit 10. At the display timings, data given to the image projection units PJ1, PJ2, . . . , PJN do not vary with time, because the stored, adjusted images are simply masked. Therefore, it is not necessary to have an input image storage unit to store entered images. This is similar to the case of moving pictures since processing at the instant when each frame of image is given is possible.

Figure 11:
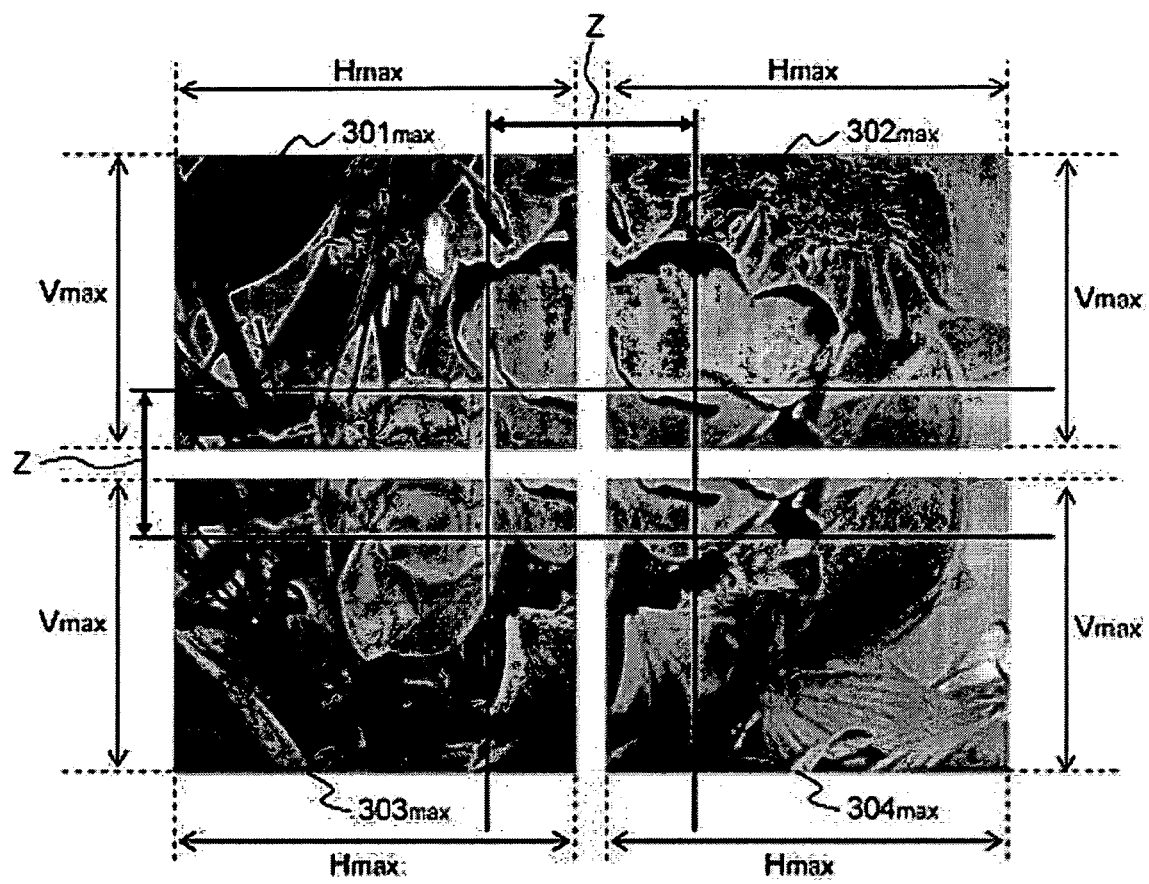
FIG. 11 shows an example of a set of divided images (maximum display divided images) obtained by dividing a whole image in a corresponding manner to maximum display regions used in exemplary Embodiment 2.

The processing of this exemplary Embodiment 2 is summarily described. First, when each image is entered, divided images (e.g., divided images 301max, 302max, 303max, and 304max each having a horizontal length of Hmax and a vertical length of Vmax as shown in FIG. 11) corresponding to maximum display regions given to the image projection units PJ1, PJ2, PJ3, and PJ4, respectively, are created by the image division unit 5 such that overlapping regions Z are present between the adjacent divided images.

The divided images 301max, 302max, 303max, and 304max (referred to as maximum display divided images) corresponding to the divided maximum display regions are previously adjusted by the image adjustment unit 7. In these adjusted maximum display divided images 301max, 302max, 303max, and 304max, the division positions within the overlapping regions Z between the maximum display divided images are varied with time. To vary the division positions, dynamic masking data corresponding to the maximum display divided images 301max, 302max, 303max, and 304max are created. The maximum display divided images 301max, 302max, 303max, and 304max are masked with the masking data, thus obtaining divided images with division positions varying with time.

Figure 12:
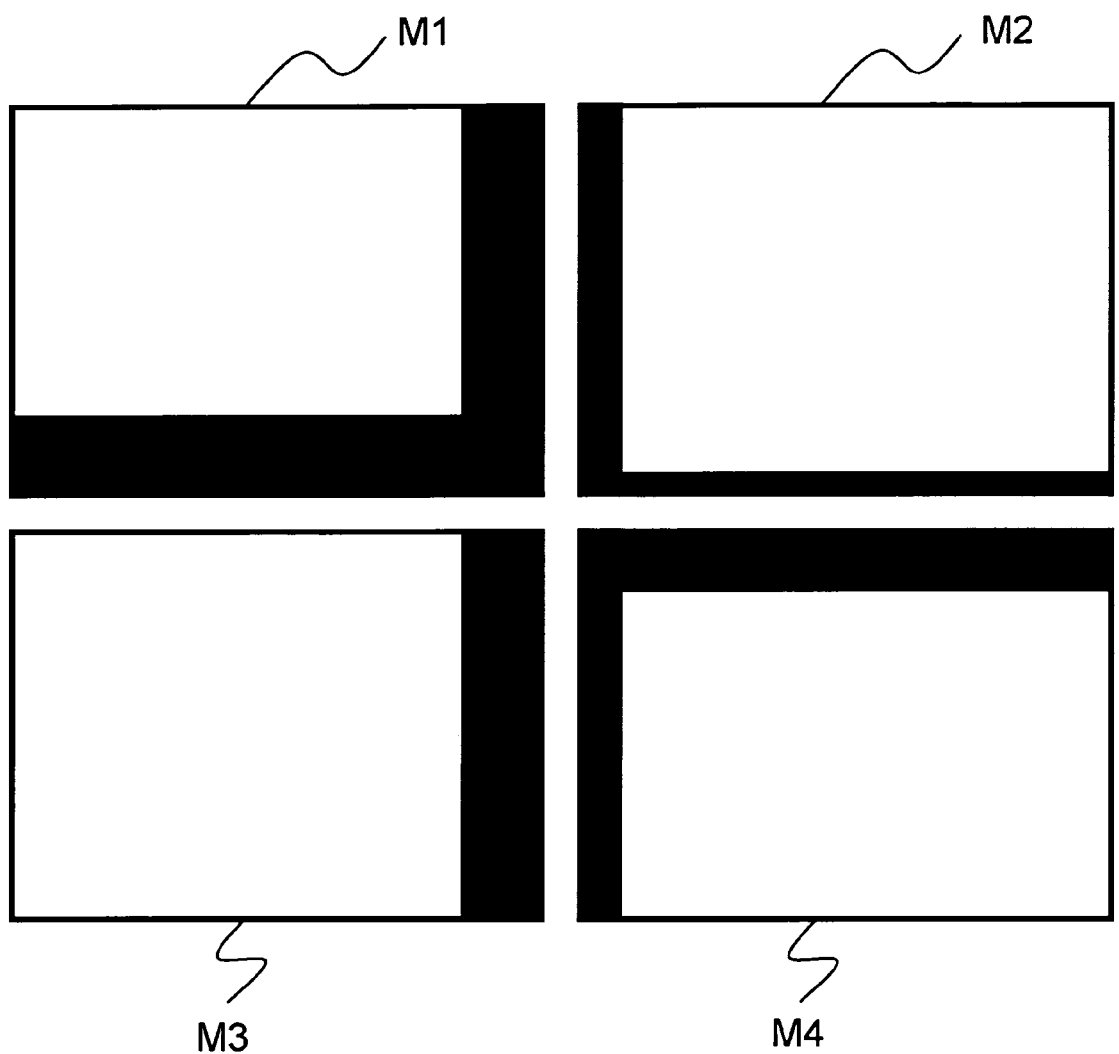
FIG. 12 is a schematic showing one example of masking data created in exemplary Embodiment 2.

The masking data are, as shown in FIG. 12, two-valued data having "1" (corresponding to white portions in FIG. 12) and "0" (corresponding to black portions in FIG. 12), for example. The maximum display divided images 301max, 302max, 303max, and 304max are dynamically masked within the overlapping regions Z using masking data sets M1, M2, M3, and M4 about the adjusted maximum display divided images 301max, 302max, 303max, and 304max as shown in FIG. 11, for example.

In this exemplary Embodiment 2, the already adjusted maximum display divided images 301max, 302max, 303max, and 304max and masking data sets M1, M2, M3, and M4 are ANDed in synchronism with the display timings t, t+1, t+2, . . . . Thus, divided images with division positions varying with time within the overlapping regions are created. That is, divided images with division positions varying with time within the overlapping regions are created by performing dynamic masking. The masked divided images are displayed by the respective image projection units PJ1, PJ2, ..., PJN. In consequence, the whole image is obtained.

Figure 13:
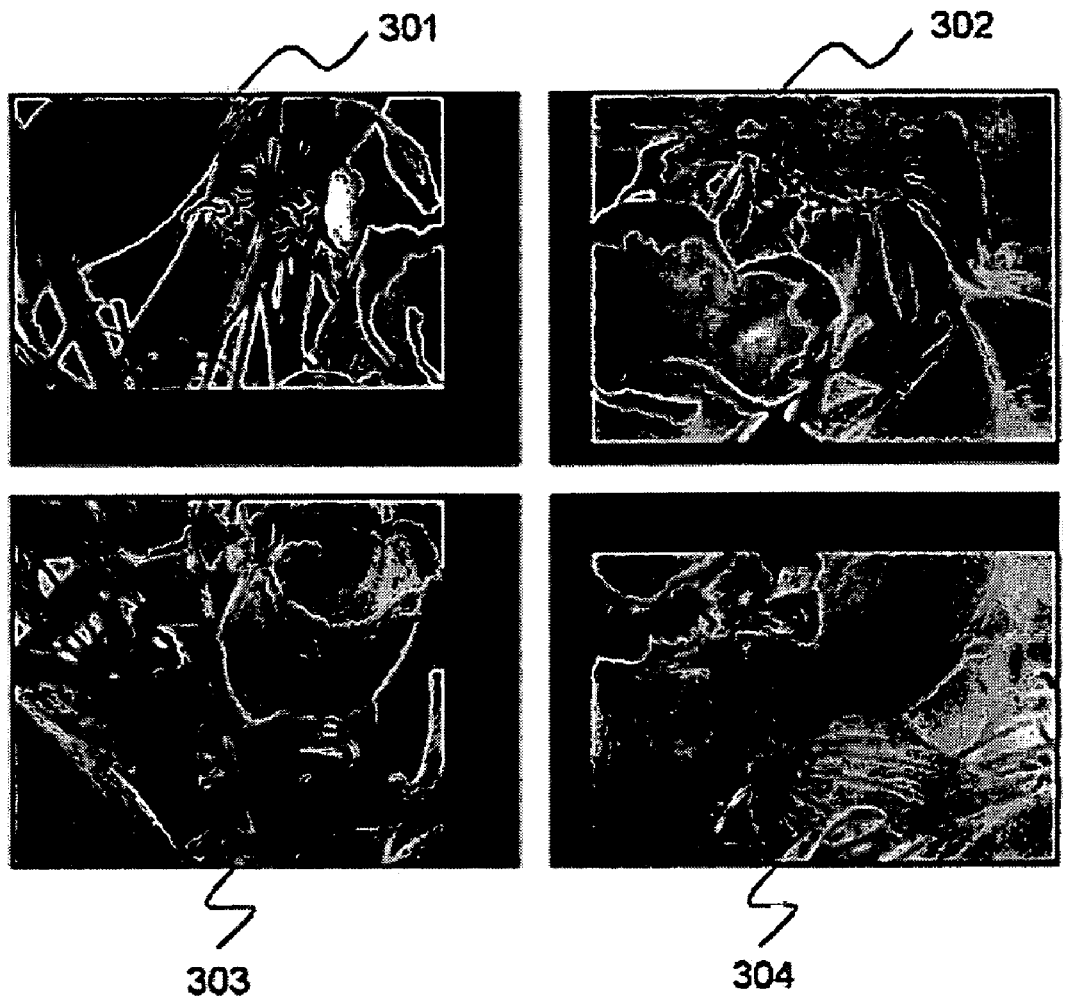
FIG. 13 is a schematic showing one example of processing for masking the maximum display divided images shown in FIG. 11 using the masking data shown in FIG. 12.

For example, ANDing the masking data sets M1, M2, M3, M4 (black portions are taken as "0") in FIG. 12 and the adjusted maximum display divided images 301max, 302max, 303max, 304max shown in FIG. 11 produces masked divided images 301, 302, 303, and 304 as shown in FIG. 13. The images shown in FIG. 13 are equivalent to the divided images 301, 302, 303, and 304 shown in (A) of FIG. 9.

Results equivalent to those described in exemplary Embodiment 1 are obtained by creating masking data varied dynamically within the overlapping regions Z between the maximum display divided images 301max, 302max, 303max, and 304max at the display timings and ANDing the created masking data sets and their respective maximum display divided images 301max, 302max, 303max, and 304max in this way.

In this exemplary Embodiment 2, image adjusting processing of large processing load (image adjusting processing performed by the image adjustment unit 7) is only required to be performed the bare minimum number of times (in the above exemplary embodiment, only once for the maximum display divided images 301max, 302max, 303max, and 304max). At each display timing, only creation of masking data that are simple two-valued data and processing of simple ANDing are carried out. Specifically, the amount of adjusting processing can be reduced compared with the case of exemplary Embodiment 1. Additionally, advantages equivalent to those of exemplary Embodiment 1 can be obtained. Note that the processing is equivalent to that of exemplary Embodiment 1 in a case where moving pictures are displayed at the frame rate.

Figure 14:
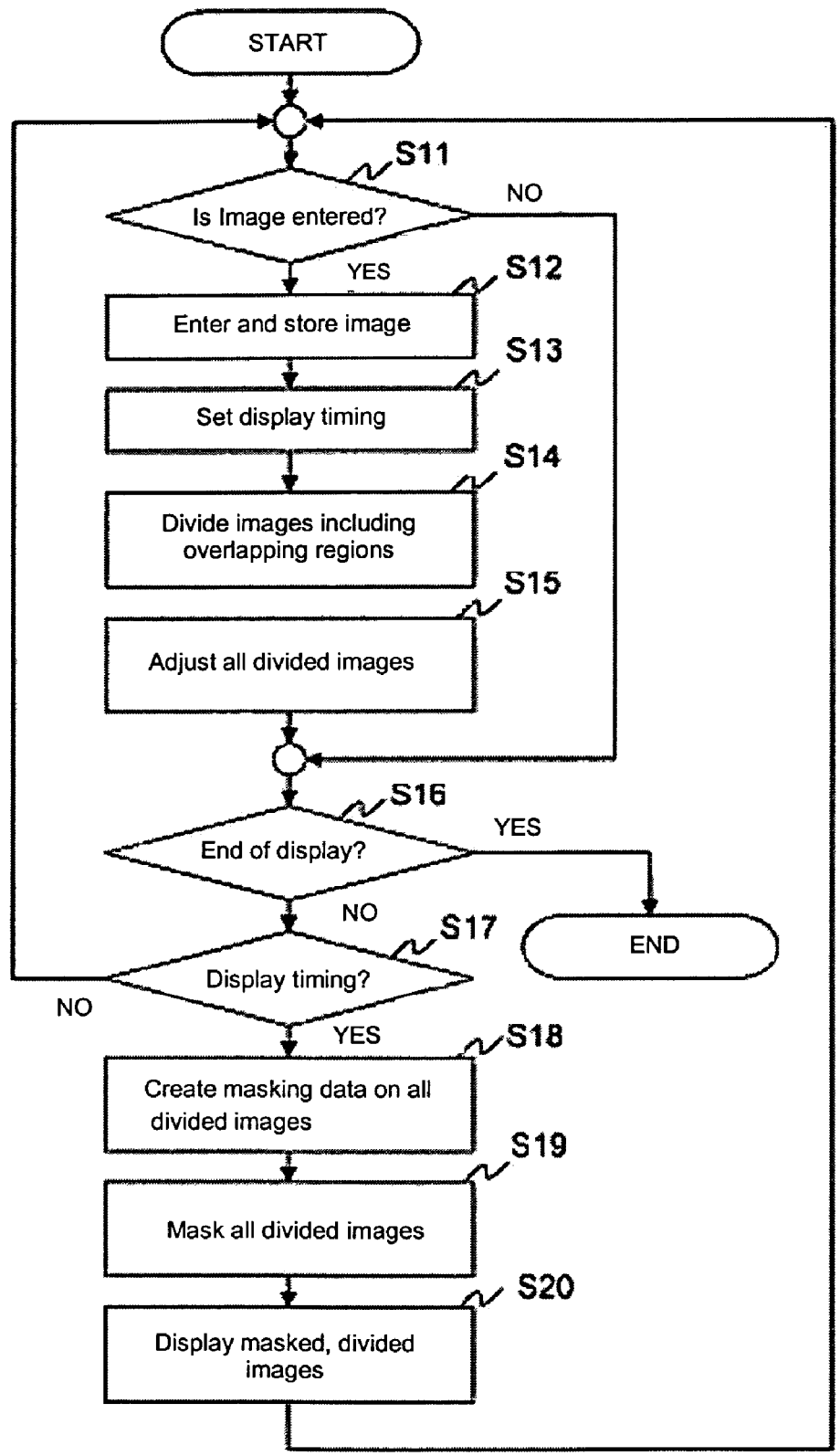
FIG. 14 is a flowchart illustrating the whole processing procedure of exemplary Embodiment 2 of the invention.

FIG. 14 is a flowchart illustrating the whole processing procedure of this exemplary Embodiment 2. Since detail processing of exemplary Embodiment 2 has been described already, the whole processing procedure is briefly described now.

In FIG. 14, a decision is first made as to whether an image to be processed is entered by the image input unit 1 (step S11). If the image should be entered, the image is entered by the image input unit 1 and temporarily stored (step S12). To simplify the explanation, in this exemplary embodiment, entry of an image, division of the image, and adjustment of the divided images are performed successively. In actual cases, if such temporal storage is omitted and if entry of image, image division, image adjustment, storage of adjusted images, and other processing are performed in parallel, higher efficiency is achieved. In this case, the processing of the step S12 is integrated with the processing of steps S14 and S15 described later.

Subsequently, the display timing is set by the display timing creation unit 3 (step S13). The division position creation unit 4 creates division positions based on information about overlap of images from the image overlapping position detection unit 6. Based on the created division positions, the image division unit 5 divides the image (step S14). At this time, the image is divided with maximum display regions (including overlapping regions) given respectively to the image projection units PJ1, PJ2, PJ3, and PJ4. The image adjustment unit 7 adjusts the maximum display divided images obtained in this way (step S15).

Then, a decision is made as to whether the display is ended or not (step S16). If the display is not ended, a decision is made as to whether it is the display timing set by step S3 (step S17). If it is the display timing, the masking data creation unit 11 creates masking data for all the maximum display divided images (step S18). Using the masking data sets created for the respective maximum display divided images, the corresponding maximum display divided images are masked (step S19). All the masked divided images are displayed by the respective image projection units PJ1, PJ2, ..., PJN (step S20).

Note that the processing procedure illustrated in this FIG. 14 merely gives an example. The order of the processing is not limited to the above-described order.

Figure 15A:
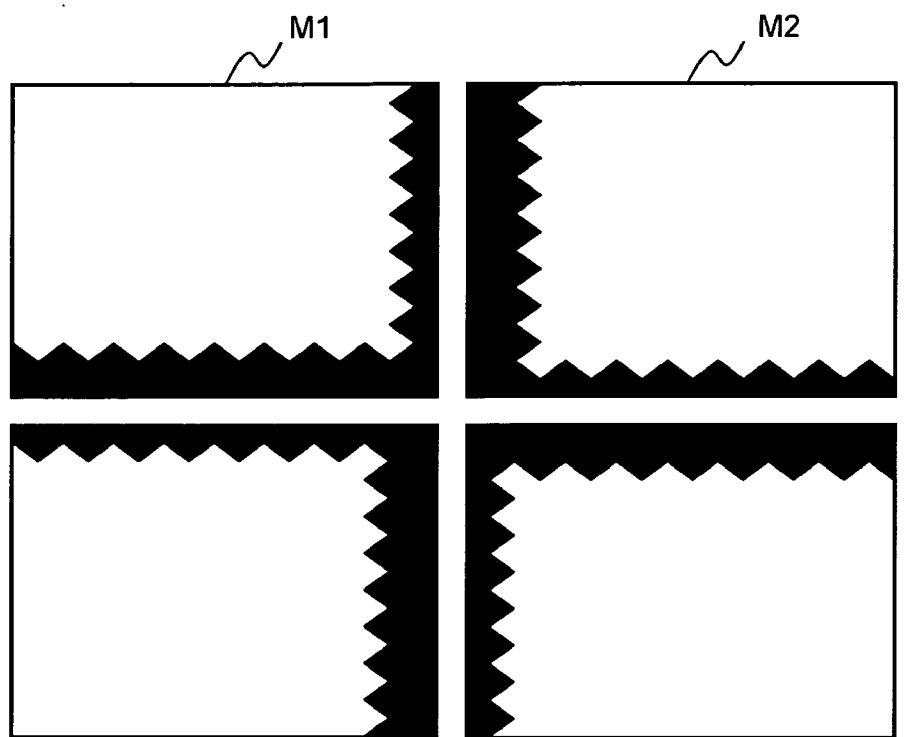
FIGS. 15A and 15B are schematics showing another example of masking data used in exemplary Embodiment 2.

Furthermore, in this exemplary Embodiment 2, masking data about arbitrary shape can be created. For example, as shown in FIG. 15A, masking data sets M1, M2, M3, and M4 about masks having portions which mask the images may be created such that the edges of these masking portions (data portions of "0") are nonlinear in shape. Furthermore, masking data sets M1, M2, M3, and M4 in which "1's" and "0's" are mixed discretely, for example, can be easily created as masking data forming a random number pattern as shown in FIG. 15B.

Figure 15B:
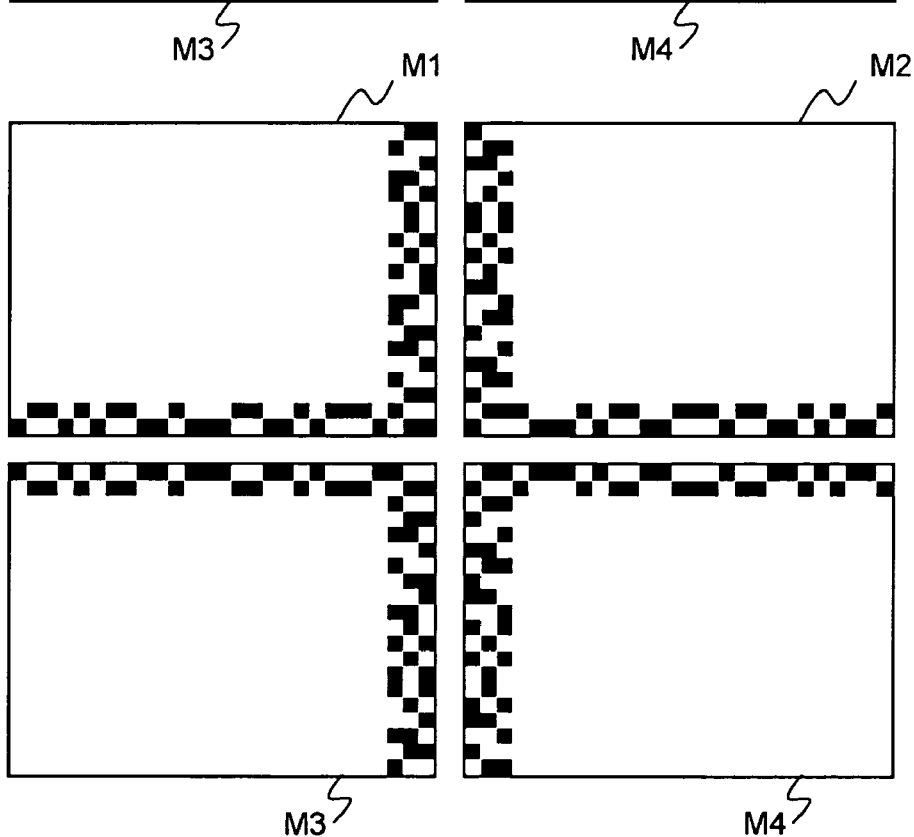

By making the masking data sets M1, M2, M3, and M4 into the form as shown in this FIGS. 15A and 15B, dynamically varying boundaries (division positions) can be made less noticeable. In the example of FIG. 15A, a saw-toothed shape is shown as an example of a nonlinear shape. The shape is not limited to this example. A wavy shape may also be used. Furthermore, they may be combined. For example, masking data in which the edges of the masks are made nonlinear and a random number pattern is created may also be created.

Exemplary Embodiment 3

Figure 16A:
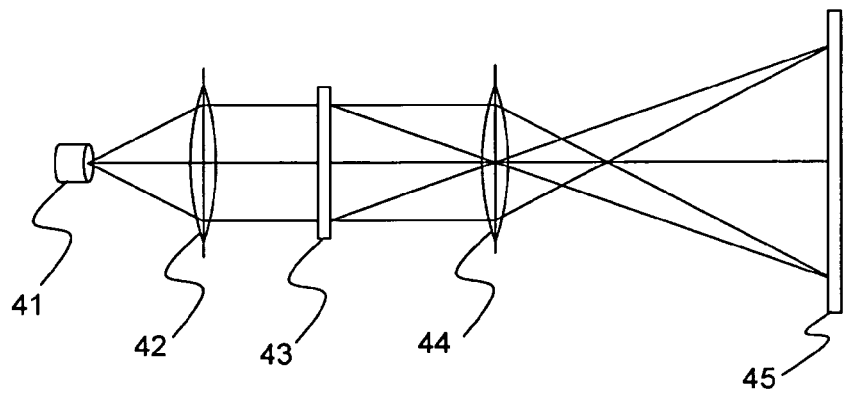
FIGS. 16A and 16B are schematics showing the configuration of the optical system of an image projection unit employing an optical switching element used in exemplary Embodiment 3 of the invention.
Figure 16B:
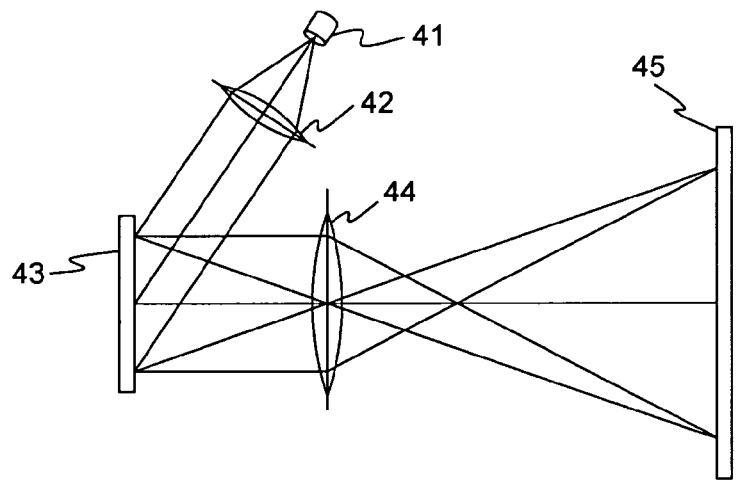
Figure 21:
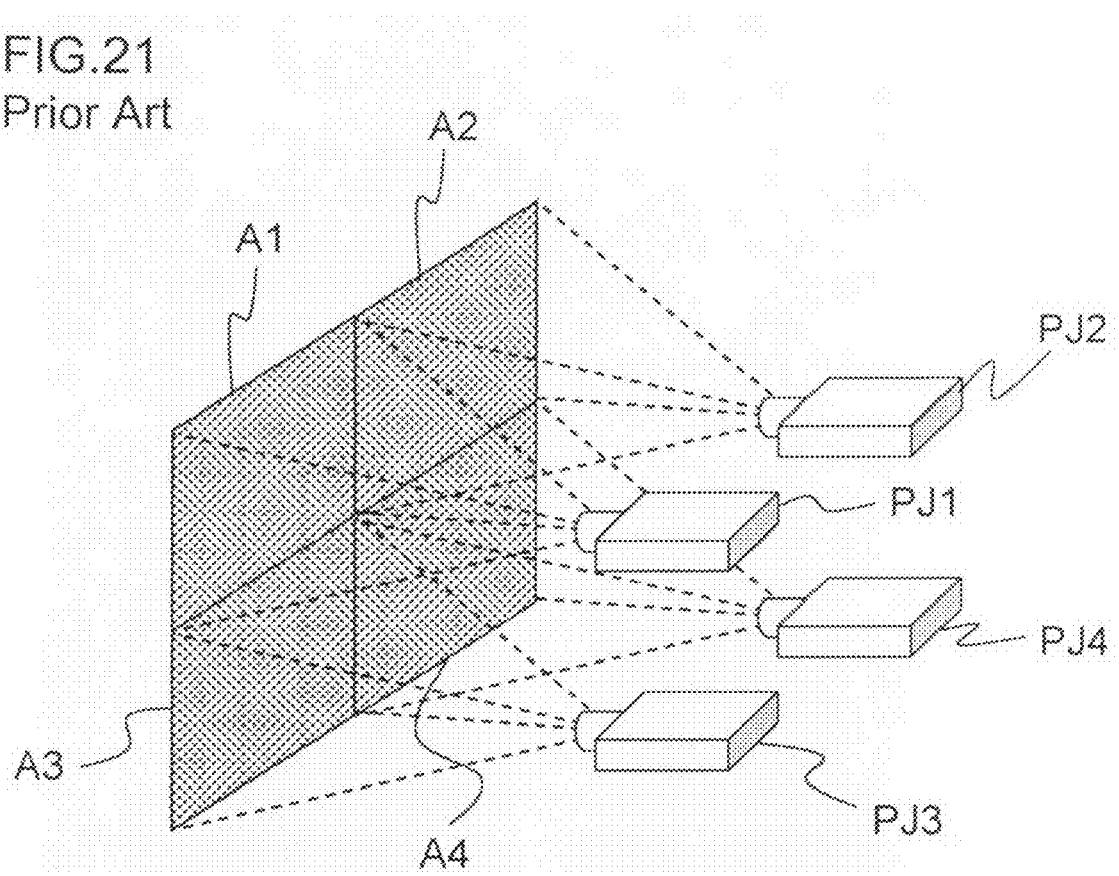
FIG. 21 is a schematic showing the configuration in a case where one whole image is created by the composite method, using four image projection units.

FIGS. 16A-16B to 20A-20E show examples of application of exemplary aspects of the present invention to an image projection unit using an optical switching element, such as a DMD. Although a light transmission type is conceivable as shown in the schematic FIG. 16A as the configuration of the image projection unit using an optical switching element, such as a DMD, a light reflection type as shown in FIG. 16B is often used.

The optical system of a light transmission type image projection unit shown in FIG. 16A is roughly made up of a light source 41, a lens 42, a transmission type optical switching element 43, and a projection lens 44. Besides, a screen 45 to project a displayed image is mounted. The optical system of a light reflection type image projection unit shown in FIG. 16B is roughly made up of a light source 41, a lens 42, a light reflection type optical switching element 43, such as a DMD, and a projection lens 44. Besides, a screen 45 to project a displayed image is provided in the same way as in FIG. 16A.

As the light transmission type optical switching element in FIG. 16A, a high-speed liquid crystal or self-emitting device, such as an LED array, may be used. Where a self-emitting device is used, the light source 41 and lens 42 in FIGS. 16A and 16B are dispensed with. The self-emitting device is mounted in the portion of the optical switching element 43.

An optical switching element, such as a DMD only acts to turn on and off light as the designation indicates, and cannot represent analog multiple gray levels as variations in the transmittivity or reflectivity. Therefore, the grayscale is represented digitally by modulating the On/Off times, i.e., performing a pulse width modulation (PWM) using On/Off times.

FIGS. 17A-17F and 18A and 18B illustrate the manner in which gradation levels are represented by controlling the On/Off times. For simplicity, an example of 33 gradation levels including 0 is shown here. Furthermore, for simplicity, actual display gradation is assumed to have 32 gradation levels from 0 to 31. In controlling the On/Off times, time is plotted on the horizontal axis and On times having lengths of 1, 2, 4, 8, and 16 are plotted on the time axis as shown in FIGS. 17A-17F. In the figure, the On times are given by white squares. The gradation levels are represented by combinations of On times and time average.

FIG. 18A shows an example in which a value of "21" is represented using the grayscale representation described in connection with FIGS. 17A-17F. In particular, 31 intervals are ON times at maximum. Of these 31 intervals, 21 intervals are turned ON, thus representing the value "21". What is important here is only what percent of the maximum number of intervals is ON. Therefore, it is not always necessary to set the ON times as shown in FIG. 18A. For example, as shown in FIG. 18B, a method of establishing ON times more uniformly in terms of time may be used. In FIG. 18B, the total interval is divided into three subintervals. Seven ON times are assigned to each subinterval, whereby a total number of ON times is 21.

In this way, in the method of grayscale representation using control of ON and OFF times, the display boundaries (division positions) can be made less noticeable more efficiently by creating display timings within the intrinsic periods (i.e., by creating the division positions).

FIG. 19A illustrates control of ON and OFF times of FIG. 18A. During this control of ON and OFF times, display timings are created, i.e., the division positions are created. As shown in FIG. 19B, the former half of the whole grayscale range is displayed, for example, by one image projection unit. The image projection unit PJ1 is used as this one image projection unit. As shown in FIG. 19C, the whole grayscale range is represented by other image projection unit that shares an overlapping region with the image projection unit PJ1. The image projection unit PJ2 is used as the other image projection unit.

Some of the represented gradation levels using control of ON and OFF times are assigned to some image projection unit. The remaining are assigned to other image projection unit. In this meaning, the method is close to the overlapping method. However, at any instant of time, only one image projection unit is displaying a display point. Hence, the superiority of the composite method is realized.

FIGS. 20A-20E are similar to FIGS. 19A-19C but shows an example in which division positions are created along the timing at which ON and OFF times are controlled, the timing being intrinsic to the aforementioned processing method of FIGS. 19A-29C. Display timings (i.e., division positions) are created at irregular intervals. FIGS. 20A-20E show an example in which display timings (i.e., division positions) are created at regular intervals. FIGS. 20A-20E show an example of the grayscale representation shown in FIG. 18B.

In this way, in the example of FIGS. 20A-20E, the interval in which grayscale is represented is uniformly divided into four subintervals. At the uniformly spaced points, display timings (i.e., division positions) are created. ON times are appropriately rearranged between the division points. Thus, fewer timings of switching between ON and OFF are achieved.

In the example of this FIGS. 20A-20E, the four image projection units PJ1, PJ2, PJ3, and PJ4 are arranged, for example, as shown in FIG. 22. The exemplary aspects of the invention can be applied to the example of control of the division positions in the overlapping regions between the images produced from the four image projection units PJ1, PJ2, PJ3, and PJ4.

As described so far, according to exemplary aspects of the present invention, a large-area screen or high resolution can be accomplished quite easily using plural image projection units. Simply, where N image projection units are used, the total brightness is N times the brightness of each image projection unit. Also, the total number of pixels is increased by a factor of N. In practical situations, there are overlapping regions and so the number is somewhat reduced. Yet, the method is much easier to accomplish than the method of increasing the brightness of a single image projection unit or increasing the number of pixels.

Consequently, a high-brightness display that can be viewed indoors in the daytime, an ultrahigh resolution display, or the like can be accomplished.

It is to be understood that the present invention is not limited to the above-described exemplary embodiments. For example, in the above exemplary embodiments, the image display control apparatus of an exemplary aspect of the invention is mounted separately from the image projection units PJ1, PJ2, . . . , PJN, such as projectors in FIGS. 1 and 10. This is one example of configuration for achieving exemplary aspects of the present invention. Image display control apparatus of exemplary aspects of the present invention may be mounted in individual image projection units PJ1, PJ2, . . . , PJN, respectively.

Furthermore, exemplary aspects of the present invention make it possible to create a program to control image display, the program having a description of a processing procedure to achieve the exemplary aspects of the invention. The image display control program can be recorded on a recording medium, such as a floppy disk, optical disk, or hard disk. Exemplary aspects of the invention embrace the recording medium, on which the image display control program has been recorded. Additionally, this image display control program may be obtained from a network.

What is claimed is:

1. A method of displaying a whole image by plural image projection units, the method comprising:

installing the image projection units, each being capable of projecting a partial image in each of a plurality of display regions, such that overlapping regions are formed in parts of the display regions;

creating a division position within each of the overlapping regions such that the division position varies at time intervals, the division position varying in synchronism with display timing;

generating the partial images by dividing the whole image at the created division position such that the partial images do not overlap each other when the image projection units project their respective partial images, a size of the partial images varies according to a change of the division position;

adjusting the generated partial images in shape according to installation conditions of the plural image projection units; and displaying the adjusted partial images by the plural image projection units.

2. The method of controlling image display in claim 1, the image projection units using optical switching elements giving a digital grayscale representation as optical control elements, the method comprising:

assigning an image projection unit a portion of represented gradation levels, the image projection units having mutually overlapping regions, such that within a time period, the optical switching elements represent the digital grayscale, and varying the division position when the image projection unit representing the digital grayscale changes.

3. A method of displaying a whole image by plural image projection units, the method comprising:

installing the image projection units, each being capable of projecting a partial image in each of a plurality of display regions, such that overlapping regions are formed in parts of the display regions;

creating divided images corresponding to the plural image projection units respectively such that adjacent ones of the divided images have the mutually overlapping regions;

creating masking data for masking a given range within each of the overlapping regions of the adjacent divided images such that a division position within each of the overlapping regions varies at time intervals, the division position varying in synchronism with display timing;

creating partial images by masking a given range within each of the overlapping regions of the adjacent divided images by the created masking data such that the partial images do not overlap each other when the image projection units project their respective partial images, a size of the partial images varies according to a change of the division position;

adjusting the generated partial images in shape according to installation conditions of the plural image projection units; and displaying the adjusted partial images by the plural image projection units.

4. The method of controlling image display in claim 3, the given display regions that the plural image projection units respectively display are maximum display regions given to the plural image projection units, respectively.

5. The method of controlling image display of claim 3, further including adjusting the images divided by creating the divided images immediately before creating the masking data.

6. The method of controlling image display of claim 3, the masking data forming nonlinear ends.

7. The method of controlling image display of claim 3, the masking data forming a random number pattern.

8. An image display apparatus for displaying a whole image, the image display apparatus comprising:

plural image projection units, each being capable of projecting a partial image in each of a plurality of display regions, installed such that overlapping regions are formed in parts of the display regions, a division position creation unit to create a division position within each of the overlapping regions such that the division position varies at time intervals, the division position varying in synchronism with display timing;

an image division unit to divide the whole image at the created division position such that the partial images do not overlap each other when the image projection units project their respective partial images, a size of the partial images varies according to a change of the division position; and a unit to adjust the generated partial images in shape according to installation conditions of the plural image projection units.

9. An image display apparatus for displaying a whole image comprising:

plural image projection units, each of which being capable of projecting a partial image;

an image division unit to create divided images corresponding to the plural image projection units respectively such that adjacent ones of the divided images have mutually overlapping regions;

a masking data creation unit to create masking data for masking a given range within each of the overlapping regions of the adjacent divided images such that a division position within each of the overlapping regions varies at time intervals, the division position varying in synchronism with display timing;

an image data masking processing unit to create partial images by masking the given range within each of the overlapping regions between the adjacent divided images by the created masking data such that the partial images do not overlap each other when the image projection units project their respective partial images, a size of the partial images varies according to a change of the division position; and a unit to adjust the generated partial images in shape according to installation conditions of the plural image projection units.

10. A computer readable recording medium containing a program to display a whole image by plural image projection units, each being capable of projecting a partial image in each of a plurality of display regions, installed such that overlapping regions are formed in parts of the projected display regions, the program comprising:

a procedure of creating a division position within each of the overlapping regions such that the division position varies at time intervals, the division position varying in synchronism with display timing;

a procedure of dividing the whole image at the created division position such that the partial images do not overlap each other when the image projection units project their respective partial images, a size of the partial images varies according to a change of the division position;

a procedure of adjusting the generated partial images in shape according to installation conditions of the plural image projection units; and a procedure of displaying the adjusted partial images by the plural image projection units.

11. A computer readable recording medium containing a program to display a whole image by plural image projection units, each being capable of projecting a partial image in each of a plurality of display regions, installed such that overlapping regions are formed in parts of the projected display regions, the program comprising:

a procedure of creating divided images corresponding to the plural image projection units respectively such that overlapping regions are formed between adjacent ones of the divided images;

a procedure of creating masking data for masking a given range within each of the overlapping regions between the adjacent divided images such that a division position within each of the overlapping regions varies at time intervals, the division position varying in synchronism with display timing;

a procedure of creating partial images by masking the given range within each of the overlapping regions between the adjacent divided images by the created masking data such that the partial images do not overlap each other when the image projection units project their respective partial images, a size of the partial images varies according to a change of the division position;

a procedure of adjusting the created partial images in shape according to installation conditions of the plural image projection units; and a procedure of displaying the adjusted partial images by the plural image projection units.

* * * * *